United States Patent [19]

Kono et al.

[11] Patent Number: 5,643,136
[45] Date of Patent: Jul. 1, 1997

[54] SLIP CONTROL APPARATUS FOR MOTOR VEHICLE LOCK-UP CLUTCH

[75] Inventors: Katsumi Kono, Toyota; Shinya Nakamura, Owariasahi, both of Japan

[73] Assignee: Toyota Jidosha Kabushiki Kaisha, Toyota, Japan

[21] Appl. No.: 504,758

[22] Filed: Jul. 19, 1995

[30] Foreign Application Priority Data

Jul. 22, 1994 [JP] Japan .................................. 6-171245

[51] Int. Cl.$^6$ .................................................. F16H 61/14
[52] U.S. Cl. .......................... 477/169; 477/98; 477/174; 477/175
[58] Field of Search ........................ 477/169, 170, 477/174, 175, 176, 96, 97, 82, 98

[56] References Cited

U.S. PATENT DOCUMENTS

| | | | |
|---|---|---|---|
| 5,085,301 | 2/1992 | Imamura et al. | 477/169 |
| 5,086,889 | 2/1992 | Nobumoto et al. | 477/176 X |
| 5,277,287 | 1/1994 | Ishii et al. | 477/169 X |
| 5,425,687 | 6/1995 | Taga et al. | 477/97 X |
| 5,484,353 | 1/1996 | Lux et al. | 477/175 X |
| 5,558,597 | 9/1996 | Oba et al. | 477/98 |
| 5,569,117 | 10/1996 | Kono et al. | 477/169 |

FOREIGN PATENT DOCUMENTS

| | | | |
|---|---|---|---|
| 60-151457 | 8/1985 | Japan . | |
| 4-224361 | 8/1992 | Japan . | |
| 4-224363 | 8/1992 | Japan . | |
| 5-180330 | 7/1993 | Japan | 477/176 |

*Primary Examiner*—Khoi Q. Ta
*Attorney, Agent, or Firm*—Oblon, Spivak, McClelland, Maier & Neustadt, P.C.

[57] ABSTRACT

A slip control apparatus for a fluid-operated lock-up clutch in a power transmitting system of a motor vehicle, wherein the amount of slip of the lock-up clutch is controlled such that the actual slip speed of the clutch coincides with a target value. The apparatus includes a device for establishing a restricted slip control mode if the vehicle running condition upon detection of a judder of the clutch is in a first area in which the clutch is likely to experience the judder. In the restricted slip control mode, the slip control of the clutch is inhibited while the vehicle running condition is in the first area, but is permitted while the vehicle running condition is in a second area in which the clutch is unlikely to experience the judder. The first and second areas of the vehicle running conditions are defined by parameters such as engine load or throttle valve opening and temperature of an oil used for operating the clutch.

16 Claims, 14 Drawing Sheets

| SHIFT POSITION | | SOLENOID VALVES | | C1 | C2 | B1 | B2 | F1 | B3 | F2 | C0 | F0 | B0 |
|---|---|---|---|---|---|---|---|---|---|---|---|---|---|
| | | S1 | S2 | | | | | | | | | | |
| P | | ⊗ | ⊗ | | | | | | | | ○ | | |
| R | | ⊗ | ⊗ | | ○ | | | | ○ | | ○ | | |
| N | | ⊗ | ⊗ | | | | | | | | ○ | | |
| D | 1st | ○ | × | ○ | | | | | | | ○ | ○ | |
| | 2nd | ○ | ○ | ○ | | | ○ | | | ○ | ○ | ○ | |
| | 3rd | × | ○ | ○ | ○ | | ○ | ○ | | | ○ | ○ | |
| | O/D | × | × | ○ | ○ | | ○ | | | | | | ○ |
| S | 1st | ○ | × | ○ | | | | | | | ○ | ○ | |
| | 2nd | ○ | ○ | ○ | | | ○ | ○ | | ○ | ○ | ○ | |
| | 3rd | × | ○ | ○ | ○ | ○ | ○ | | | | ○ | | |
| | (O/D) | × | × | ○ | ○ | | ○ | | | | | | ○ |
| L | 1st | ○ | × | ○ | | | | | | | ○ | ○ | |
| | 2nd | ○ | ○ | ○ | | ○ | ○ | ○ | ○ | ○ | ○ | ○ | |

| MODE | FEATURE | ESTABLISHED WHEN | CANCELLED WHEN | EFFECT AND ADVANTAGE |
|---|---|---|---|---|
| NORMAL SLIP CONTROL MODE | Permitting slip control in areas A and B | | | |
| RESTRICTED SLIP MODE | Permitting slip control in area B only | Clutch judder is detected in area A | Cumulative slip control time after the judder detection exceeds 30 minutes | Maximizing slip control time by restoring normal slip control mode after warm-up period |
| FIRST INHIBIT MODE | Inhibiting slip control | Clutch judder is detected in area B | Ignition key is operated | Maximizing slip control time by establishing restricted slip control mode to deal with erroneous judder detection |
| SECOND INHIBIT MODE | Inhibiting slip control | Heavy clutch judder is detected after 5 hours of cumulative slip control time | Ignition key has been operated 100 times | Preventing occurrence of judder by inhibiting slip control once heavy judder has occurred |

5,643,136

SLIP CONTROL APPARATUS FOR MOTOR VEHICLE LOCK-UP CLUTCH

BACKGROUND OF THE INVENTION

1. Field of the Invention

The present invention relates to an apparatus for controlling the amount of slip of a lock-up clutch provided in a power transmitting system of a motor vehicle.

2. Discussion of the Related Art

In a motor vehicle having a fluid-filled power transmitting device equipped with a lock-up clutch such as a torque converter or fluid coupling incorporating such a lock-up clutch, it is proposed to control the lock-up clutch in a slip control mode (partially slipping or engaging mode) such that an actual amount of slip (slip speed) of the lock-up clutch, namely, a difference between the speeds of a pump impeller and a turbine impeller of the power transmitting device eventually coincides with a predetermined target slip speed, for the purpose of improving the fuel economy of the vehicle while minimizing the power loss due to slipping of the lock-up clutch during acceleration of the vehicle. The slip control mode is established when the running condition of the vehicle is in a predetermined slip control area which is intermediate between a fully releasing area in which the lock-up clutch should be held in a fully released state, and a fully engaging area in which the lock-up clutch should be held in a fully engaged state. These fully releasing, fully engaging and slip control areas are defined by parameters (e.g., throttle valve opening and vehicle running speed) indicative of the vehicle running condition. In a motor vehicle equipped with a fuel-cut device adapted to cut a supply of a fuel to the engine while the engine speed is higher than a predetermined fuel-cut speed, it is proposed to control the lock-up clutch in the slip control mode even during deceleration of the vehicle, in order to raise the engine speed and thereby increase the time duration during which the fuel supply to the engine is cut.

While the lock-up clutch is controlled in the slip control mode, the friction condition of the lock-up clutch may be unstable due to deterioration of a working oil, use of an unsuitable oil, or due to changing of the condition of the friction surface of the lock-up clutch. Consequently, the lock-up clutch may suffer from a phenomenon of so-called "judder", namely, random variation or fluctuation of the slip speed (amount of slip) of the lock-up clutch. Once the "judder" phenomenon happens, it tends to continue throughout the slip control operation, leading to deterioration of the running stability of the vehicle. In view of this drawback, it is proposed to terminate the slip control of the lock-up clutch in the event of detection of the "judder" phenomenon of the lock-up clutch, as disclosed in JP-A-60-151457.

However, the slip control apparatus for the lock-up clutch as disclosed in the publication identified above is adapted to terminate the slip control upon detection of the "judder", irrespective of the cause for the judder. This arrangement leads to a drawback that the slip control of the lock-up clutch does not provide an intended or desired effect.

SUMMARY OF THE INVENTION

It is therefore an object of the present invention to provide a slip control apparatus for a lock-up clutch of a motor vehicle, which is arranged so as to maximize the effect of the slip control of the lock-up clutch.

As a result of extensive studies by the inventors of the present invention on the slip control of the lock-up clutch in the light of the prior art problem discussed above, the inventors found that a judder of the lock-up clutch occurs by various causes and has different characteristics under different running conditions of the vehicle, and that a certain judder which occurs under a certain running condition of the vehicle will not occur or will be removed under other running conditions of the vehicle, making it possible to continue the slip control of the lock-up clutch under such other running conditions, for thereby increasing the effect of the slip control of the lock-up clutch. The present invention was developed based on this finding.

The object indicated above may be achieved according to one aspect of the present invention, which provides an apparatus for controlling an amount of slip of a lock-up clutch disposed between a pump impeller and a turbine impeller in a power transmitting system of a motor vehicle, the apparatus including slip control means for controlling the amount of slip of the lock-up clutch such that an actual slip speed of the lock-up clutch coincides with a predetermined target slip speed, the apparatus comprising: (a) judder detecting means for detecting an occurrence of a judder of the lock-up clutch during a slip control operation of the lock-up clutch by the slip control means; (b) memory means for storing area data representative of a first area and a second area of a running condition of the vehicle, which areas are defined such that the lock-up clutch is relatively likely to experience the judder while the running condition is in the first area, and relatively unlikely to experience the judder while the running condition is in the second area; and (c) slip control restricting means for establishing a restricted slip control mode if the running condition upon detection of the judder by the judder detecting means is in the first area, the slip control restricting means operating in the restricted slip control mode, so as to inhibit the slip control means from effecting the slip control operation of the lock-up clutch when the running condition of the vehicle is in the first area, and to permit the slip control means to effect the slip control operation when the running condition is in the second area.

In the slip control apparatus of the present invention constructed as described above, the area data representative of the first and second areas of the vehicle running condition are stored in the memory means, and the slip control restricting means is adapted to establish the restricted slip control mode if the running condition upon detection of the judder by the judder detecting means is in the first area in which the lock-up clutch is relatively likely to experience the judder. In the restricted slip control mode, the slip control means is inhibited from effecting the slip control of the lock-up clutch while the vehicle running condition is in the first area, and is permitted to effect the slip control while the vehicle running condition is in the second area.

In the present slip control apparatus, the lock-up clutch is controlled in the restricted slip control mode even after a judder of the lock-up clutch occurred under the vehicle running condition in the first area in which the clutch is relatively likely to experience the judder. In the restricted slip control mode, the slip control of the lock-up clutch is permitted while the vehicle running condition is in the second area in which the lock-up clutch is relatively unlikely to experience the judder, but is inhibited while the vehicle running condition is in the first area. Therefore, the slip control time of the lock-up clutch is increased as a whole, and the effect of the slip control to improve the fuel economy of the vehicle is accordingly increased.

According to a first preferred form of the invention, the slip control apparatus further comprises: (d) warm-up period monitoring means operable in the restricted slip control mode established by the slip control restricting means, for determining whether a predetermined warm-up period of the lock-up clutch has passed after the restricted slip control mode is established; and (e) slip control restriction cancelling means for cancelling the restricted slip control mode, if the warm-up period monitoring means determines that the warm-up period has passed. In this preferred form of the invention, the predetermined warm-up period expires during the slip control operation of the lock-up clutch in the restricted slip control mode, that is, slip control while the vehicle running condition is in the second area in which the judder is relatively unlikely to occur. During the warm-up period, the friction surface condition of the clutch becomes steady. The restricted slip control mode is cancelled to permit the slip control also while the vehicle running condition is in the first area. Thus, the slip control time and effect are further increased, and the fuel economy of the vehicle is accordingly improved.

According to a second preferred form of the invention, the apparatus further comprises slip control inhibiting means for establishing a slip control inhibit mode if the vehicle running condition upon detection of the judder by the judder detecting means is in the second area. The slip control inhibiting means operates in the slip control inhibit mode, so as to inhibit the slip control means from effecting the slip control operation of the lock-up clutch irrespective of whether the running condition of the vehicle is in the first area or the second area. In this form of the slip control apparatus, the slip control of the lock-up clutch is inhibited if the vehicle running condition upon detection of the judder is in the second area in which the judder of the lock-up clutch is relatively unlikely to occur. The slip control inhibit mode is established because the judder is not expected to be removed if the judder occurred when the vehicle running condition is in the second area.

According to one advantageous arrangement of the above preferred form of the slip control apparatus, the apparatus further comprises slip control inhibition cancelling means for cancelling the slip control inhibit mode and permitting the slip control operation of the lock-up clutch when a predetermined inhibition time has passed after the slip control inhibit mode is established by the slip control inhibiting means. In this arrangement, the slip control of the clutch may be re-started after the expiration of the predetermined slip control inhibition time which is suitable for the clutch to become steady.

The object indicated above may also be achieved according to a second aspect of the present invention, which provides an apparatus for controlling an amount of slip of a lock-up clutch disposed between a pump impeller and a turbine impeller in a power transmitting system of a motor vehicle, the apparatus including slip control means for controlling the amount of slip of the lock-up clutch such that an actual slip speed of the lock-up clutch coincides with a predetermined target slip speed, the apparatus comprising: (a) judder detecting means for detecting an occurrence of a judder of the lock-up clutch during a slip control operation of the lock-up clutch by the slip control means; (b) memory means for storing area data representative of a first area and a second area of a running condition of the vehicle, which areas are defined such that the lock-up clutch is relatively likely to experience the judder while the running condition is in the first area, and relatively unlikely to experience the judder while the running condition is in the second area; and (c) slip control inhibiting means for establishing a slip control inhibit mode if the running condition upon detection of the judder by the judder detecting means is in the second area, the slip control inhibiting means operating in the slip control inhibit mode, so as to inhibit the slip control means from effecting the slip control operation of the lock-up clutch irrespective of whether the running condition of the vehicle is in the first area or the second area.

In the slip control apparatus constructed according to the second aspect of the invention, too, the area data representative of the first and second areas of the vehicle running conditions are stored in the memory means. If the vehicle running condition upon detection of the judder of the lock-up clutch by the judder detecting means is in the second area in which the judder is relatively unlikely to occur, the slip control inhibiting means establishes the slip control inhibit mode in which the slip control of the lock-up clutch by the slip control means is inhibited irrespective of whether the current vehicle running condition is in the first area or in the second area.

The present slip control apparatus provides substantially the same advantage as described above with respect to the second preferred form of the slip control apparatus according to the first aspect of the invention.

The object indicated above may also be achieved according to a third aspect of this invention, which provides an apparatus for controlling an amount of slip of a lock-up clutch disposed between a pump impeller and a turbine impeller in a power transmitting system of a motor vehicle, the apparatus including slip control means for controlling the amount of slip of the lock-up clutch such that an actual slip speed of the lock-up clutch coincides with a predetermined target slip speed, the apparatus comprising: (a) judder detecting means for detecting an occurrence of a judder of the lock-up clutch during a slip control operation of the lock-up clutch by the slip control means; (b) slip control inhibiting means for establishing a slip control inhibit mode if the judder is detected by the judder detecting means, the control inhibiting means operating in the slip control inhibit mode, so as to inhibit the slip control means from effecting the slip control operation of the lock-up clutch; (c) slip control inhibition cancelling means for cancelling the slip control inhibit mode and permitting the slip control operation of the lock-up clutch when a predetermined inhibition time has passed after the slip control inhibit mode is established by the slip control inhibiting means; and (d) inhibition time changing means for changing the predetermined inhibition time such that the inhibition time increases with an increase in a degree of variation of the slip speed of the lock-up clutch which is caused by the judder.

In the slip control apparatus constructed according to the third aspect of this invention described above, the slip control inhibiting means establishes the slip control inhibit mode if the judder of the lock-up clutch is detected. When the predetermined inhibition time has passed after the slip control inhibit mode is established by the slip control inhibiting means, the slip control inhibition cancelling means cancels the slip control inhibit mode and permits the slip control operation of the lock-up clutch. The inhibition time is changed by the inhibition time changing means such that the inhibition time increases with an increase in the degree of variation of the slip speed of the lock-up clutch.

The slip control apparatus according to the third aspect of the invention has substantially the same advantage as described above with respect to the advantageous arrangement of the second preferred form of the slip control apparatus according to the first aspect of this invention.

BRIEF DESCRIPTION OF THE DRAWINGS

The above and optional objects, features, advantages and technical significance of the present invention will be better understood by reading the following detailed description of presently preferred embodiments of the invention, when considered in conjunction of the accompanying drawings, in which:

FIG. 2 is a table indicating a relationship between the operating positions of an automatic transmission connected to the torque converter and the respective combinations of the operating states of first and second solenoid-operated valves of the slip control apparatus;

FIG. 13 is a view for explaining four different control modes of the lock-up clutch controlled in the slip control mode.

DETAILED DESCRIPTION OF THE PREFERRED EMBODIMENT

Figure 1:
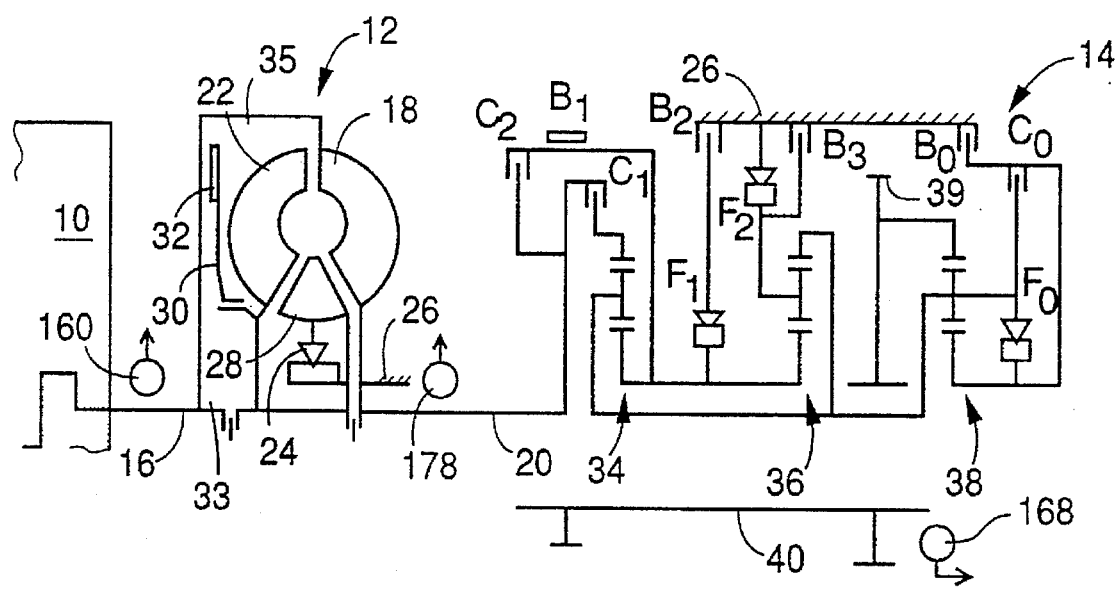
FIG. 1 is a schematic view illustrating a part of a power transmitting system of a motor vehicle, which incorporates a torque converter having a lock-up clutch to be controlled by a slip control apparatus constructed according to one embodiment of the present invention.

Referring first to the schematic view of FIG. 1, there is shown a part of a power transmitting system of a motor vehicle, wherein power generated by an engine 10 is transmitted to a differential gear device and drive wheels through a torque converter 12 equipped with a lock-up clutch 32, and an automatic transmission 14 which includes three planetary gear sets to selectively establish a plurality of operating positions (gear positions).

The torque converter 12 includes: a pump impeller 18 connected to a crankshaft 16 of the engine 10; a turbine impeller 22 fixed to an input shaft of the automatic transmission 14 and rotatable by the pump impeller 18; a stator impeller 28 fixed to a stationary member in the form of a housing 26 through a one-way clutch 24; and the above-indicated lock-up clutch 32 connected to the input shaft 20 through the turbine impeller 22. The pump impeller 18 includes a radially outer portion which is U-shaped in cross section, and a plurality of curved vanes which are arranged in the circumferential direction and formed so as to cause a flow of a working oil, which flow includes a component moving toward the turbine impeller 22 on the side of the engine 10. The turbine impeller 22 includes a plurality of curved vanes opposed to the vanes of the pump impeller 18. In operation of the torque converter 12, the turbine impeller 22 is rotated by the oil flow from the vanes of the pump impeller 18 rotated by the engine 10. The lock-up clutch 32 includes a piston 30 which engages a hub of the turbine impeller 22 such that the piston 30 is axially slidable relative to and rotatable with the turbine impeller 22.

The piston 30 of the lock-up clutch 32 divides an interior of the torque converter 12 into two oil chambers 33 and 35. The lock-up clutch 32 is released and engaged by axial movements of the piston 32 depending upon a difference between oil pressures in these two oil chambers 33, 35, which will be hereinafter referred to as a releasing oil chamber 33 and an engaging oil chamber 35, respectively. Described more specifically, the piston 30 is retracted to its fully retracted position when the pressure in the releasing oil chamber 33 is increased while the engaging oil chamber 35 is drained. When the pressure in the engaging oil chamber 35 is increased while the releasing oil chamber 33 is held at the lowest level, the piston 30 is advanced to its fully advanced position. In the fully retracted position of the piston 30, the lock-up clutch 32 is placed in its fully released position in which the torque received by the pump impeller 18 is amplified or boosted at a ratio depending upon the ratio of the input and output speeds of the torque converter 12. In the fully advanced position of the piston 30, the lock-up clutch 32 is placed in the fully engaged position in which the frictional coupling portion of the clutch 32 is forced against the radially outer U-shaped portion of the pump impeller 18, whereby the pump impeller 18 is directly connected to the input shaft 20, that is, the crankshaft 16 as an input member of the torque converter 12 is directly connected to the input shaft 20 of the transmission 14, which serves as an output member of the torque converter 12. When the pressure in the releasing oil chamber 33 is increased to a predetermined level while the pressure in the engaging oil chamber 35 is held at a higher level, the piston 30 is advanced to a predetermined position in which the frictional coupling portion of the lock-up clutch is located near the corresponding coupling portion (radially outer U-shaped portion) of the pump impeller 18. The predetermined level of the pressure in the releasing oil chamber 33 indicated above is determined by a second term ("feed forward term") of a right member of an equation (2) which will be described.

The automatic transmission 14 includes: the input shaft 20, a first, a second and a third planetary gear set 34, 36, 38; an output gear 39 which rotates with a ring gear of the third planetary gear set 38; and an output shaft in the form of a counter shaft 40 which connects the output gear 39 and the differential gear device. The planetary gear sets 34, 36, 38 include components which are connected integrally with each other, and components which are connected to each other when three clutches C0, C1, C2 are selectively engaged. The planetary gear sets 34, 36, 38 also include components which are fixed or connected to the housing 26 and thereby inhibited from rotating when four brakes B0, B1, B2, B3 are selectively engaged. The planetary gear sets 34, 36, 38 further include components which are connected to each other or to the housing 26 through three one-way clutches F0, F1, F2, depending upon the rotating directions of the components.

Each of the clutches C0, C1, C2 and brakes B0, B1, B2, B3 may consist of a multiple-disk clutch, or a band brake which uses two bands wound in opposite directions. These clutches and brakes are operated by respective hydraulically operated actuators, which are controlled by an electronic transmission controller 184 shown in FIG. 3 (which will be described), so as to selectively establish a plurality of operating positions of the automatic transmission 14. That is, the automatic transmission 14 has four forward drive positions, first-speed ("1st"), second-speed ("2nd"), 3rd-speed ("3rd") and overdrive ("O/D") positions, and one backward drive position "R", as indicated in FIG. 2. The four forward drive positions "1st", "2nd", "3rd" and "O/D" have respective different speed ratios I which decrease in the order of description. The speed ratio I is defined as the speed of the input shaft 20 divided by the speed of the counter shaft (output shaft) 40.

It is to be noted that the lower halves of the torque converter 12 and automatic transmission 14 and the upper half of the counter shaft 40 are not shown in FIG. 1 in the interest of simplification, since these elements 12, 14, 40 are symmetrical with respect to their axes of rotation.

Referring next to the block diagram of FIG. 3, there will be described a control system provided to control the engine 10, lock-up clutch 32 and automatic transmission 14 of the motor vehicle. The control system includes the electronic transmission controller 184 indicated above, which is adapted to control a hydraulic control device 44. The hydraulic control device 44 includes a transmission control circuit for shifting the automatic transmission 14 to an appropriate one of the operating positions, and a lock-up clutch control circuit for controlling the operating state of the lock-up clutch 32. The transmission control circuit is provided with a first and a second solenoid-operated valve S1, S2, which have respective solenoid coils. The clutches C0, C1, C2 and brakes B0, B1, B2, B3 are selectively engaged to selectively establish the operating positions ("1st", "2nd" "3rd", and "O/D") of the transmission 14, depending upon respective combinations of the operating states of the first and second solenoid-operated valves S1, S2, as indicated in FIG. 2. In this figure, "o" indicates the energization of the solenoid coils of the valves S1, S2 or the engagement of the clutches and brakes.

Figure 4:
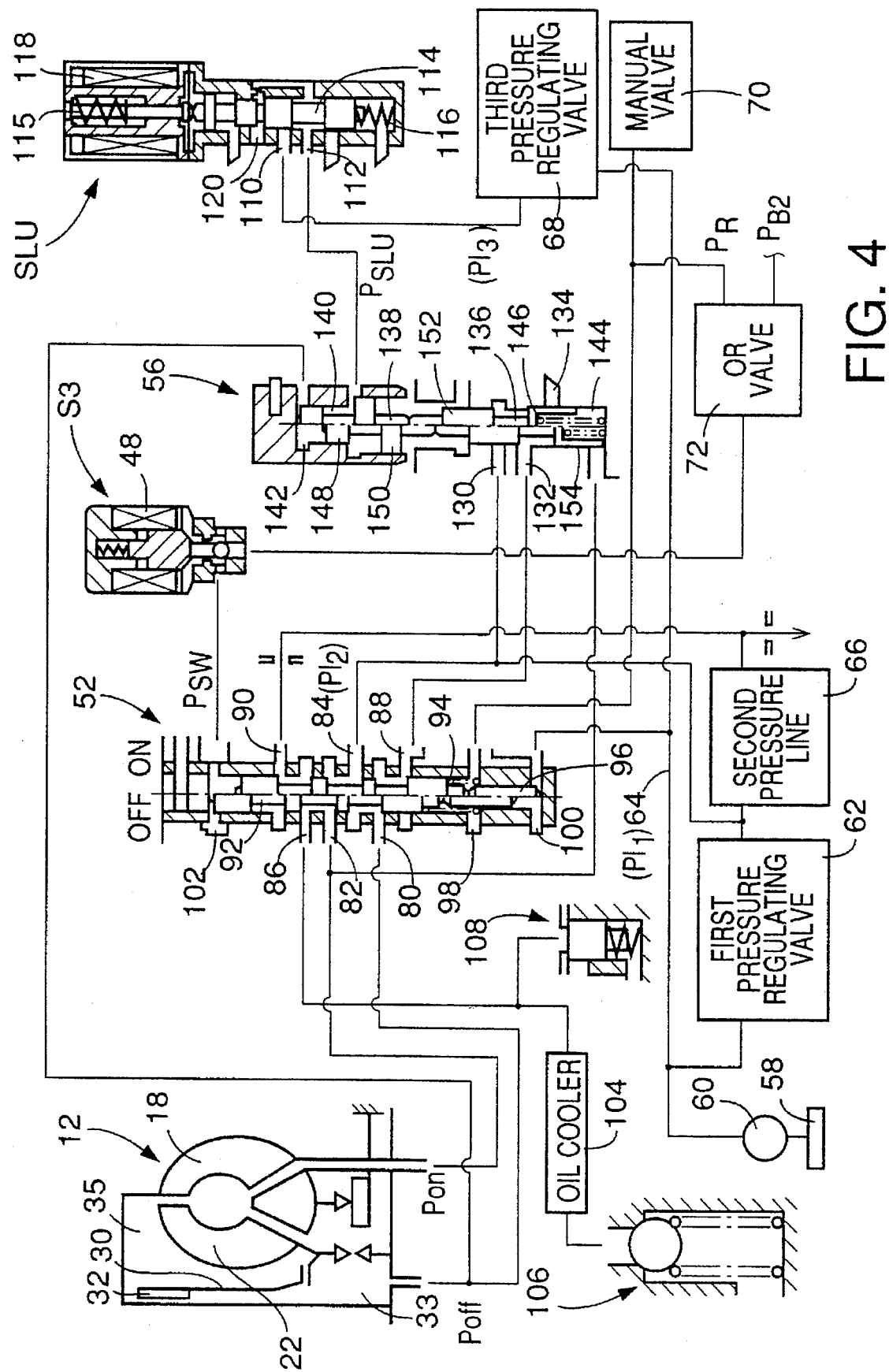
FIG. 4 is a view illustrating a part of a hydraulic control device shown in FIG. 3, which incorporates a circuit for controlling the lock-up clutch.
Figure 5:
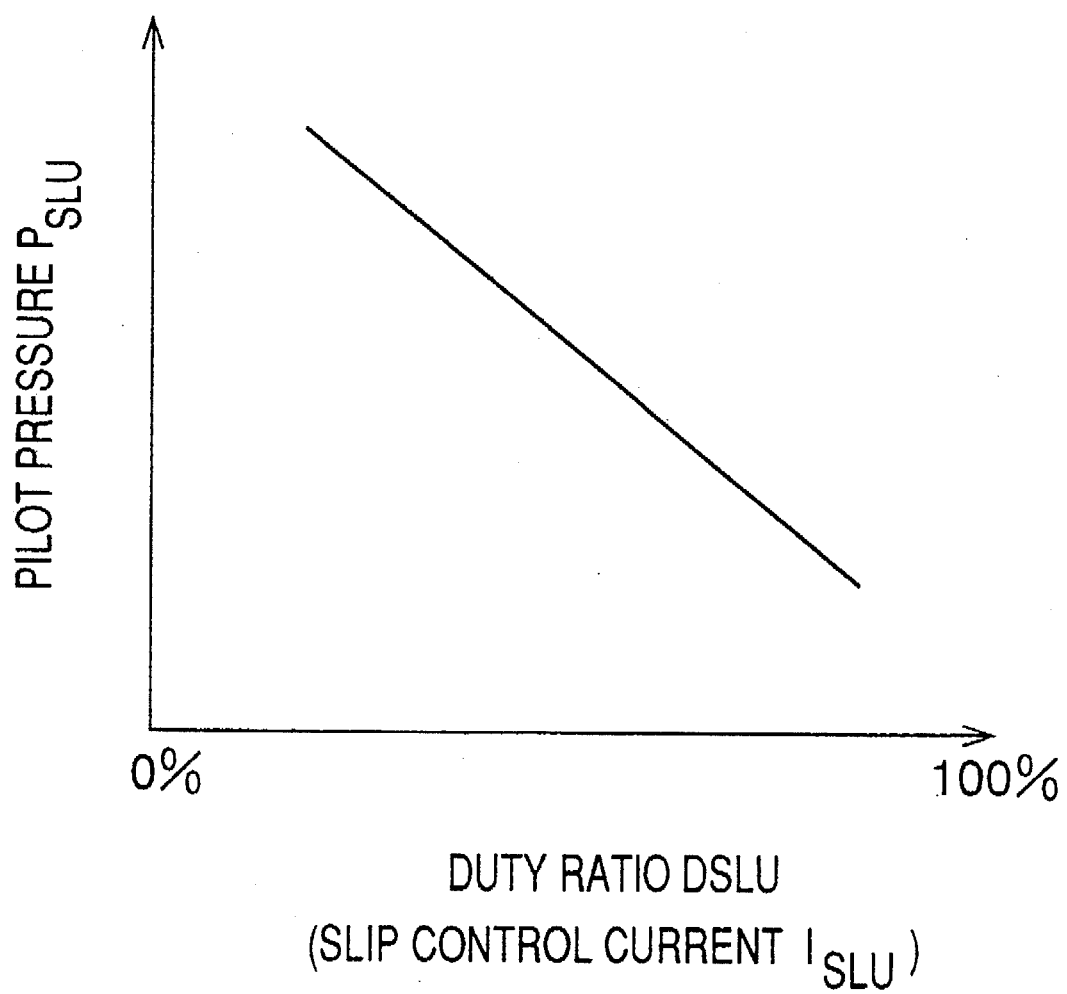
FIG. 5 is a graph indicating an output characteristic of a linear solenoid valve provided in the lock-up clutch control circuit of FIG. 4.

The lock-up clutch control circuit of the hydraulic control device 44 includes a third solenoid-operated valve S3, a lock-up relay valve 52, a linear solenoid valve SLU, and a lock-up clutch control valve 56, as shown in FIG. 4. The third solenoid-operated valve S3 has a solenoid coil 48 which is turned on and off. When the coil 48 is on, the valve 53 generates a LOCK-UP SWITCHING pressure $P_{SW}$. The lock-up relay valve 52 has a releasing state and an engaging state for releasing and engaging the lock-up clutch 32, respectively, depending upon whether the pilot pressure $P_{SW}$ is generated by the valve S3. The linear solenoid valve SLU is adapted to generate a SLIP CONTROL pilot pressure $P_{SLU}$ corresponding to a SLIP CONTROL current $I_{SLU}$ supplied from the transmission controller 184. The lock-up clutch control valve 56 is adapted to regulate a pressure difference $\Delta P$ between the pressures in the engaging and releasing oil chambers 35, 33 of the torque converter 12, according to the SLIP CONTROL pilot pressure $P_{SLU}$ received from the linear solenoid valve SLU, for thereby controlling an amount of slip of the lock-up clutch 32.

As shown in FIG. 4, the hydraulic control device 44 includes a pump 60 for pressuring a working oil sucked from a suitable reservoir through a strainer 58. The pump 60 is driven by the engine 10. The pressure of the oil delivered by the pump 60 is adjusted to a first line pressure Pl1 by a first pressure regulating valve 62 of an overflow type. The first pressure regulating valve 62 is arranged to receive a THROTTLE pilot pressure indicative of an opening TAP of a first throttle valve 166 (FIG. 3), and regulate the first line pressure Pl1 in a first pressure line 64 such that the pressure Pl1 increases with the THROTTLE pilot pressure. The hydraulic control device 44 further has a second pressure regulating valve 66 of an overflow type, which is adapted to regulate the pressure of the oil received from the first pressure regulating valve 62, to a second line pressure Pl2 according to the THROTTLE pressure, so that the second line pressure Pl1 corresponds to the output torque of the engine 10. The device 44 further has a third pressure regulating valve 68, which is a pressure reducing valve adapted to reduce the first line pressure Pl1 to a predetermined third line pressure Pl3.

The motor vehicle has a shift lever 174 (FIG. 3) which has six operating positions "P" (PARKING), "R" (REVERSE), "N" (NEUTRAL), "D" (DRIVE), "S" (SECOND) and "L" (LOW), as indicated in FIG. 2. The hydraulic control device 44 includes a manual valve 70 (FIG. 4) adapted to generate a REVERSE pressure $P_R$ when the shift lever 174 is placed in the REVERSE position "R" (which is the backward drive position referred to above with respect to the automatic transmission 14). The device 44 also includes an OR valve 72 which is adapted to generate a higher one of a BRAKE B2 pressure $P_{B2}$ and the REVERSE pressure $P_R$, which serves as the LOCK-UP SWITCHING pilot pressure $P_{SW}$ generated when the valve S3 is turned ON as explained below in detail. The BRAKE B2 pressure $P_{B2}$ is generated to engage the brake B2 for establishing the second-speed ("2nd"), third-speed ("3rd") and overdrive ("O/D") positions.

The lock-up relay valve 52 has: a releasing port 80 communicating with the releasing oil chamber 33; an engaging port 82 communicating with the engaging oil chamber 35; an input port 84 adapted to receive the second line pressure Pl2; a first drain port 86 through which the oil in the engaging oil chamber 35 is discharged when the lock-up clutch 32 is released; a second drain port 88 through which the oil in the releasing oil chamber 33 is discharged when the lock-up clutch 32 is engaged; a supply port 90 adapted to receive the oil discharged from the second pressure regulating valve 66 so that the oil is cooled during engagement of the lock-up clutch 32; a spool 92 operable between an ON position and an OFF position, for switching the mutual communication or connection of the ports indicated above; a spring 94 for biasing the spool 92 toward the OFF position; a plunger 96 abuttable on the end of the spool 92 on the side of the spring 94; an oil chamber 98 defined between the above-indicated end of the spool 92 and the opposed end of the plunger 96, and adapted to receive the REVERSE pressure $P_R$ from the manual valve 70; an oil chamber 100 partially defined by the other end of the plunger 96 and adapted to receive the first line pressure Pl1; and an oil chamber 102 partially defined by the other end of the spool 92 and adapted to receive the LOCK-UP SWITCHING pressure $P_{SW}$ from the third solenoid-operated valve S3, for generating a thrust force for moving the spool 92 toward the ON position.

The third solenoid-operated valve S3 has a ball which is seated on a valve seat to disconnect a line communicating with the oil chamber 102 of the lock-up relay valve 52 and the OR valve 72 when the solenoid coil 48 is de-energized or OFF. In this state, the LOCK-UP SWITCHING pilot pressure $P_{SW}$ is not applied to the oil chamber 102. When the coil 48 is energized or ON, the ball is unseated to permit the communication between the OR valve 72 and the oil chamber 102, whereby the LOCK-UP SWITCHING pressure $P_{SW}$ is applied to the oil chamber 102. In the OFF state of the valve S3, therefore, the spool 92 of the lock-up relay valve 52 is moved to its OFF position by the biasing force of the spring 94 and a force based on the first line pressure Pl1 in the oil chamber 100, whereby the input port 84 communicates with the releasing port 80 while the first drain port 86 communicates with the engaging port 82. As a result, a pressure Poff in the releasing oil chamber 33 is made higher than a pressure Pon in the engaging oil chamber 35, to thereby release the lock-up clutch 32, while at the same time the engaging chamber 35 is drained through the first drain port 86, an oil cooler 104 and a check valve 106.

In the ON state of the valve S3, on the other hand, the LOCK-UP SWITCHING pilot pressure $P_{SW}$ is applied to the oil chamber 102, and the spool 92 is moved by a force based on the pressure $P_{SW}$, against the biasing force of the spring 94 and the force based on the first line pressure Pl1 in the oil chamber 100, whereby the input port 84 communicates with the engaging port 82 while the first and second drain ports 86, 88 communicate with the supply and releasing ports 90, 80, respectively. As a result, the pressure Pon in the engaging oil chamber 35 is made higher than the pressure Poff in the releasing oil chamber 33, to thereby engage the lock-up clutch 32, while at the same time the releasing oil chamber 33 is drained through the second drain port 88 and the lock-up clutch control valve 56.

The linear solenoid valve SLU is a reducing valve adapted to reduce the predetermined third line pressure Pl3 to the SLIP CONTROL pilot pressure $P_{SLU}$, such that the pilot pressure $P_{SLU}$ increases with an increase in the SLIP CONTROL current $I_{SLU}$ supplied from the transmission controller 184, namely, increases with an increase in a duty ratio $D_{SLU}$ of the linear solenoid valve SLU. The thus controlled pilot pressure $P_{SLU}$ is applied to the lock-up clutch control valve 56. The linear solenoid valve SLU has: a supply port 110 adapted to receive the third line pressure Pl3; an output port 112 from which the SLIP CONTROL pilot pressure $P_{SLU}$ is applied to the valve 56; a spool 114 for closing and opening the ports 110, 112; a spring 115 for biasing the spool 114 in a valve closing direction; a spring 116 for biasing the spool 114 in a valve opening direction by a force smaller than that of the spring 115; a solenoid coil 118 for biasing the spool 114 in the valve opening direction by a force determined by the SLIP CONTROL current $I_{SLU}$; and an oil chamber 120 adapted to receive a feedback pressure (SLIP CONTROL pilot pressure $P_{SLU}$) which biases the spool 114 in the valve closing direction. The spool 114 is moved to a position of equilibrium between a sum of the biasing forces of the solenoid coil 118 and the spring 116 and a sum of the biasing force of the spring 115 and a force based on the feedback pressure $P_{SLU}$.

The lock-up clutch control valve 56 has: a line pressure port 130 adapted to receive the second line pressure Pl2; an input port 132 adapted to receive the oil discharged from the releasing oil chamber 33 through second drain port 88 of the valve 52; a drain port 134 through which the oil received by the input port 132 is discharged; a spool 136 operable between a first position (indicated at left in FIG. 4) and a second position (indicated at right in FIG. 4); a plunger 138 abuttable on the spool 136 for biasing the spool 136 toward the first position; an oil chamber 140 adapted to receive the SLIP CONTROL pilot pressure $P_{SLU}$ for biasing the plunger 138 so as to generate a thrust force which biases the spool 136 toward the first position; an oil chamber 142 adapted to receive the oil pressure Poff in the releasing oil chamber 33, for biasing the plunger 138 so as to generate a thrust force which biases the spool 136 toward the first position; an oil chamber 144 adapted to receive the oil pressure Pon in the engaging oil chamber 35, for generating a thrust force for biasing the spool 136 toward the second position; and a spring 146 received in the oil chamber 144, for biasing the spool 136 toward the second position.

In the first position of the spool 136 of the lock-up clutch control valve 56, the input port 132 communicates with the drain port 134 to cause the releasing oil chamber 33 to be drained, for thereby increasing the pressure difference ΔP (=Pon−Poff) of the oil chambers 33, 35. In the second position of the spool 136, the input port 132 communicates with the line pressure port 130 to cause the second line pressure Pl2 to be applied to the releasing oil chamber 33, for thereby reducing the pressure difference ΔP.

The plunger 138 has a first land 148 adjacent to the oil chamber 142, and a second land 150 remote from the oil chamber 142. The first land 148 has a cross sectional area A1, and the second land 150 has a cross sectional area A2 larger than the area A1. The spool 136 has a third land 152 adjacent to the pilot pressure oil chamber 140, and a fourth land 154 remote from the oil chamber 140. The third land 152 has a cross sectional area A3, and the fourth land 154 has a cross sectional area equal to the cross sectional area A1. In this arrangement of the lock-up clutch control valve 56, the plunger 138 and the spool 136 are moved together as a unit with the plunger 138 held in abutting contact with the spool 136. With the movement of the plunger and spool 138, 136, the pressure difference ΔP (=Pon−Poff) on the opposite sides of the piston 30 of the lock-up clutch 32 is controlled depending upon the SLIP CONTROL pilot pressure $P_{SLU}$ generated by the linear solenoid valve SLU. The pressure difference ΔP changes with the pilot pressure $P_{SLU}$ as shown in FIG. 6, at a rate or gradient represented by a value (A2−A1)/A1 included in the following equation (1):

$$\Delta P = Pon - Poff = [(A2-A1)/A1]P_{SLU} - Fs/A1 \qquad (1)$$

where, Fs: biasing force of the spring 146.

Figure 6:
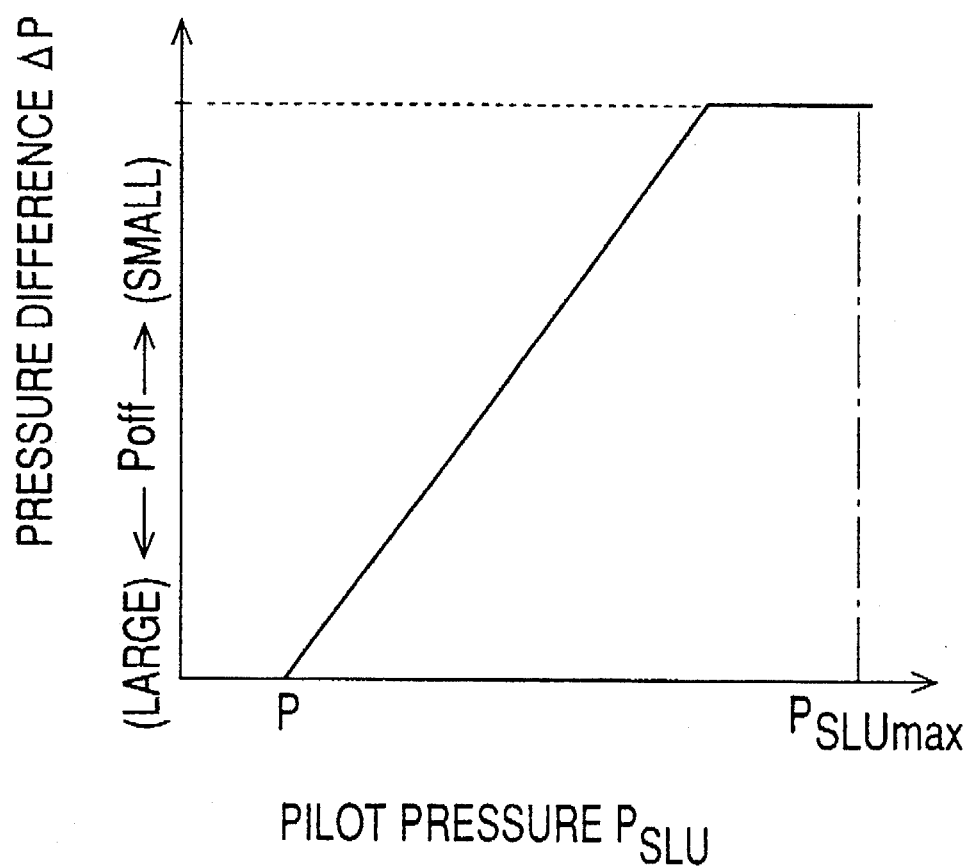
FIG. 6 is a graph indicating an output characteristic of a lock-up clutch control valve provided in the lock-up clutch control circuit of FIG. 4, namely, a relationship between a pilot pressure $P_{SLU}$ received by the lock-up clutch control valve and a pressure difference $\Delta P$ of engaging and releasing oil chambers of the lock-up clutch.

The graph of FIG. 6 indicates the output characteristic of the lock-up clutch control valve 56, namely, the relationship between the pressure difference ΔP generated by the valve 56 and the SLIP CONTROL pilot pressure $P_{SLU}$ generated by the valve SLU. While the lock-up clutch control valve 56 is ON with the spool 136 placed in the first position, an increase in the pilot pressure $P_{SLU}$ results in an increase in the pressure difference ΔP of the engaging and releasing oil chambers 35, 33, and thereby causes a decrease in a slip speed $N_{SLP}$ of the lock-up clutch 32, while a decrease in the pilot pressure $P_{SLU}$ causes an increase in the slip speed $N_{SLP}$. The slip speed $N_{SLP}$ is a difference ($N_P-N_T$) between a speed $N_P$ of the pump impeller 18 (speed $N_E$ of the engine 10) and a speed $N_T$ of the turbine impeller 22 (speed Nin of the input shaft 20).

Figure 3:
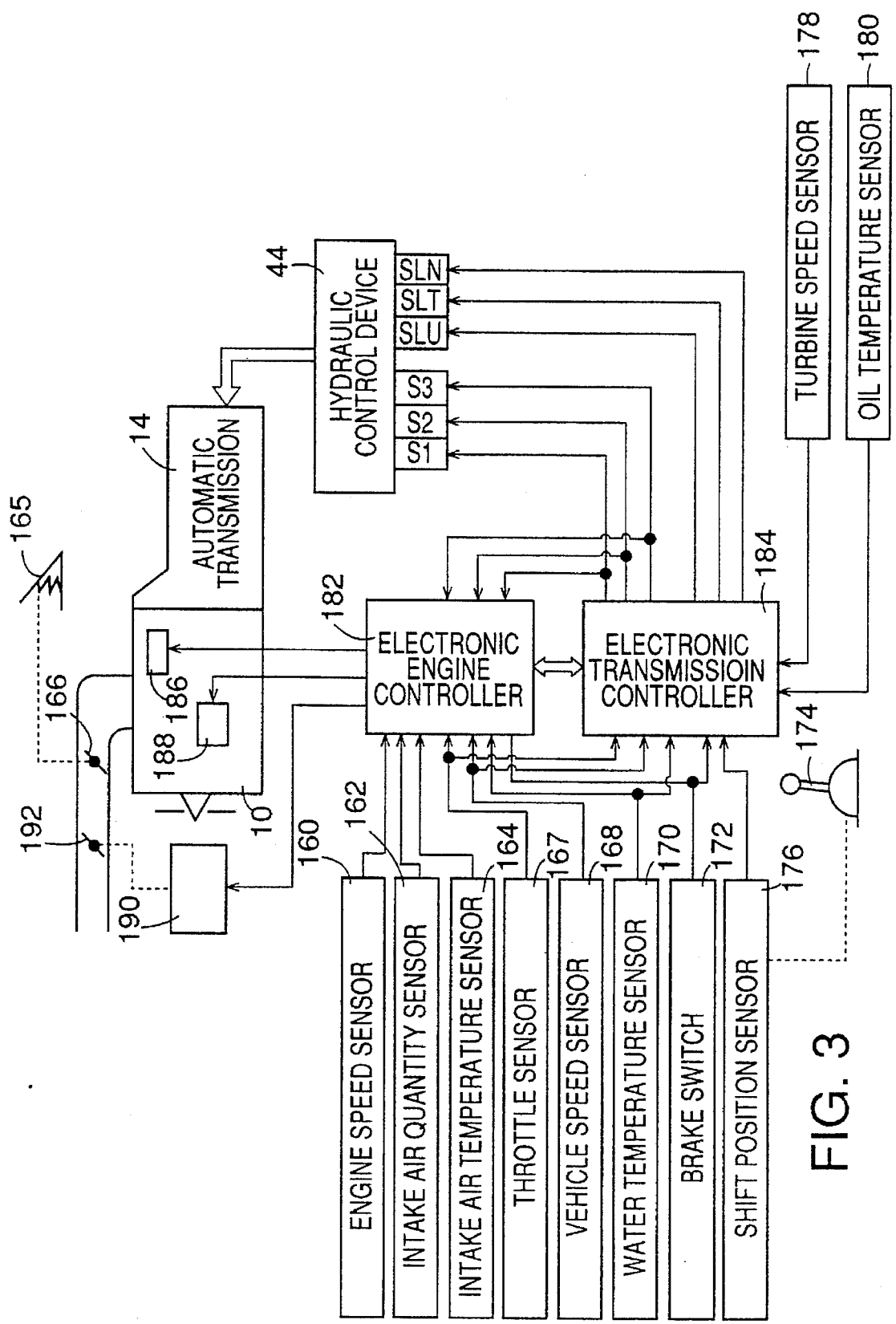
FIG. 3 is a block diagram showing a control system for the motor vehicle, which includes a transmission controller incorporating the slip control apparatus for the lock-up clutch.

Referring back to the block diagram of FIG. 3, the motor vehicle has various sensors and switches including: an engine speed sensor 160 for detecting the speed $N_E$ of the engine 10, that is, speed $N_P$ of the pump impeller 18; an intake air quantity sensor 162 for detecting a quantity Q of an intake air sucked into the engine 10 through an intake pipe; an intake air temperature sensor 164 for detecting a temperature $T_{AIR}$ of the intake air; a throttle sensor 167 for detecting the opening TAP of the first throttle valve 166 operated by an accelerator pedal 165, the throttle sensor 167 being equipped with an idling position switch for detecting the idling position of the throttle valve 166; a vehicle speed sensor 168 for detecting a running speed V of the vehicle on the basis of a speed Nout of the output shaft 40 of the automatic transmission 40; a water temperature sensor 170 for detecting a temperature $T_{WA}$ of a coolant water of the engine 10; a brake switch 172 for detecting an operation of a brake pedal; a shift position sensor 176 for detecting a currently selected operating position Ps of the automatic transmission 40, namely, a currently selected one of the operating positions "L", "S", "D", "N", "R" and "P" of the shift lever 174; a turbine speed sensor 178 for detecting the speed $N_T$ of the turbine impeller 22, that is, the speed Nin of the input shaft 20 of the transmission 20; and an oil temperature sensor 180 for detecting a temperature THO of the working oil in the hydraulic control device 44, which is supplied to the torque converter 12. The output signals generated by the above sensors and switch are applied directly or indirectly to an electronic engine controller 182 and the electronic transmission controller 184. The two controllers 182, 184 are connected to each other by a communication interface, for applying the necessary signals to each other.

The transmission controller 184 is comprised of a so-called microcomputer incorporating a central processing unit (CPU), a read-only memory (ROM), a random-access memory (RAM) and an interface. The CPU processes the input signals according to various control programs stored in the ROM, while utilizing a temporary data storage function of the RAM, for controlling the automatic transmission 14 and the lock-up clutch 32 by controlling the first, second and third solenoid-operated valves S1, S2, S3 and the linear solenoid valve SLU.

For controlling the automatic transmission 14 so as to shift the transmission 14 to the appropriate operating position, a plurality of shift patterns are stored in the ROM, and one of the shift patterns which corresponds to the currently selected position of the transmission 14 is selected to determine the operating position (one of the four forward drive positions) to which the transmission 14 should be shifted down or up. For instance, each shift pattern consists of a shift-down boundary line and a shift-up boundary line which are relationships between the throttle valve opening TAP and the vehicle speed V. On the basis of the determined forward drive position to which the transmission 14 should be shifted, the solenoid-operated valves S1 and S2 are suitably controlled (with their solenoid coils being suitably energized or de-energized), so as to establish an appropriate combination of the operating states of the clutches and brakes C0, C1, C2, B0, B1, B2, B3, which combination corresponds to the determined forward drive position.

Figure 7:
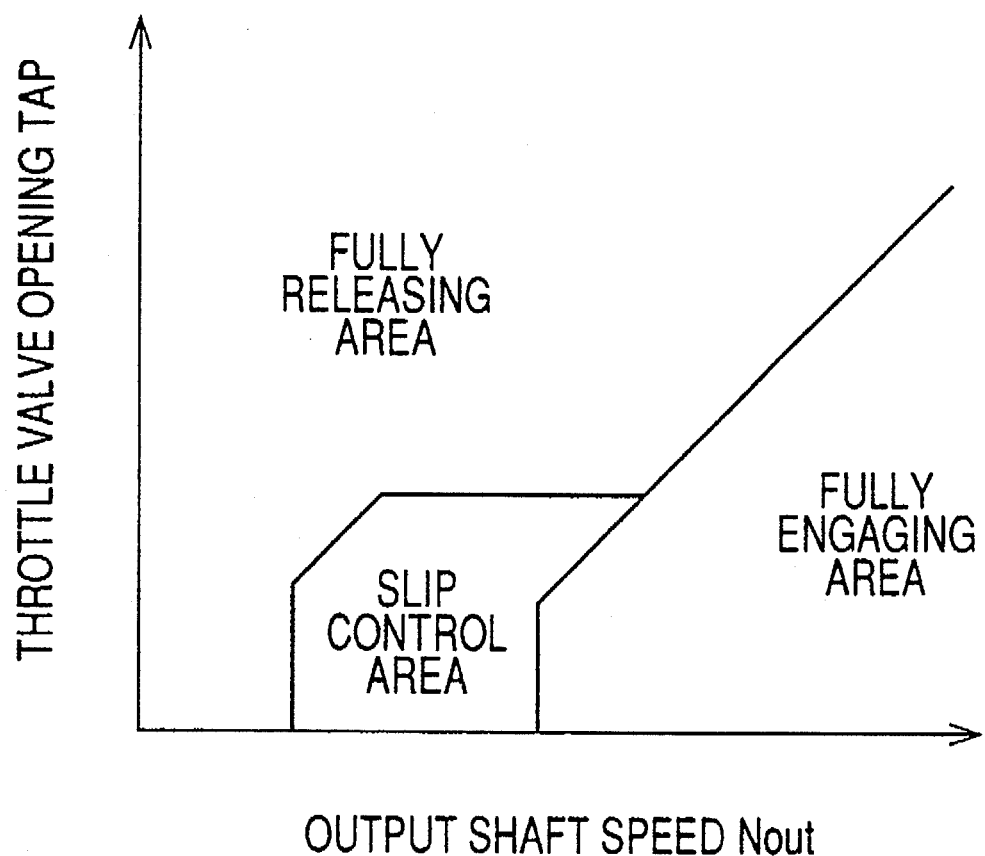
FIG. 7 is a view indicating boundaries defining different control areas of the lock-up clutch in relation to the running condition of the vehicle, which boundaries are stored in the slip control apparatus shown in FIG. 3.

The transmission controller 184 is adapted to control the lock-up clutch 32 in the manner explained below, when the vehicle is running with the transmission 14 placed in the third-speed or fourth-speed or overdrive position ("3rd" or "O/D"), for example. For controlling the lock-up clutch 32 differently depending upon the running condition of the vehicle, a data map representative of predetermined boundaries defining three different control areas as indicated in FIG. 7 is stored in the ROM. For instance, the boundaries are relationships between the throttle valve opening TAP and the output speed Nout of the output shaft 40 of the transmission 14 (vehicle speed V). Described more specifically, these boundaries define a fully releasing area in which the lock-up clutch 32 should be fully released, a fully engaging area in which the clutch 32 should be fully engaged, and a slip control area in which the amount of slip of the clutch 32 should be suitably controlled according to the principle of the present invention as described below in detail. Depending upon the currently detected throttle opening TAP and output speed Nout, one of the three control areas is determined or selected by the CPU of the transmission controller 184, according to the boundaries stored in the ROM.

When the vehicle running condition (TAP and Nout) is in the slip control area, the lock-up clutch 32 is controlled to be held in a partially slipping state for transmitting power of the engine 10 to the automatic transmission 14 so as to maximize the fuel economy of the vehicle while absorbing a torque variation of the engine 10 to assure high drivability of the vehicle. The determination as to whether the vehicle running condition falls in the slip control area according to the boundaries of FIG. 7 stored in the ROM is effected while the vehicle is accelerating. In this respect, it is noted that the amount of slip of the lock-up clutch 32 is also controlled while the vehicle is coasting or decelerating with the throttle valve 166 placed in the idling position. This slip control is effected to increase an effect of the fuel-cut control of the engine 10. In other words, the slip control during the vehicle coasting with the throttle opening TAP being zero is continued until the fuel-cut control of the engine 10 by a fuel-cut control apparatus is terminated.

If the CPU of the controller 184 determines that the vehicle running condition falls in the fully engaging area, the solenoid coil of the third solenoid-operated valve S3 is energized to turn ON the lock-up relay valve 52, and the SLIP CONTROL current $I_{SLU}$ applied to the linear solenoid valve SLU is reduced to the minimum value, whereby the lock-up clutch 32 is fully engaged. If the vehicle running condition is determined to be in the fully releasing area, the solenoid coil of the valve S3 is de-energized to turn OFF the lock-up relay valve 52, so that the lock-up clutch 32 is fully released irrespective of the SLIP CONTROL current $I_{SLU}$. If the vehicle running condition is determined to be in the slip control area, the solenoid coil of the valve S3 is energized to turn ON the lock-up relay valve 52, and the SLIP CONTROL current $I_{SLU}$ to be applied to the valve SLU, that is, the duty ratio $D_{SLU}$ of the valve SLU is adjusted according to the following equation (2) to control the amount of slip of the lock-up clutch 32 in a slip control mode:

$$D_{SLU}(=I_{SLU})=DFWD+KGD+DFB \qquad (2)$$

For instance, the duty ratio $D_{SLU}$ is calculated to zero an error $\Delta E(=N_{SLP}-TNSLP)$ between a target slip speed TNSLP and the actual slip speed $N_{SLP}$ ($=N_E-N_T$) of the lock-up clutch 32. The first term DFWD of the right member of the above equation (2) is a feed-forward control value which varies as a function of the output torque of the engine 10, for example. The second term KGD of the right member is a learning control value which is updated during slip control cycles, to compensate for a feedback deviation due to fluctuation of the operating characteristic of the lock-up clutch 32. The third term DFB is a feedback control value which is a sum of a proportional value, a differential value and an integral value of the error $\Delta E$, as indicated by the following equation (3):

$$DFB=K_P[\Delta E+(1/T1)\int \Delta E dt+T_D(d\Delta E/dt)] \qquad (3)$$

The electronic engine controller 182 is comprised of a microcomputer similar to that of the transmission controller 184, which has a CPU adapted to process the input signals according to programs stored in a ROM while utilizing a temporary data storage function of a RAM, for controlling the engine 10, more specifically, for effecting a fuel injection control for controlling a fuel injection valve 186 so as to optimize the combustion condition of the engine 10, an ignition control for controlling an ignitor 188 so as to optimize the ignition timing, a traction control for controlling a second throttle valve 192 via a throttle actuator 190 so as to control the traction force of the vehicle while preventing slipping of the drive wheels on the road surface and assuring running stability of the vehicle, and a fuel-cut control for holding the fuel injection valve 186 closed while the engine speed $N_E$ is higher than a predetermined fuel-cut threshold level $N_{CUT}$ during coasting of the vehicle, so that the fuel economy of the vehicle is improved.

Figure 8:
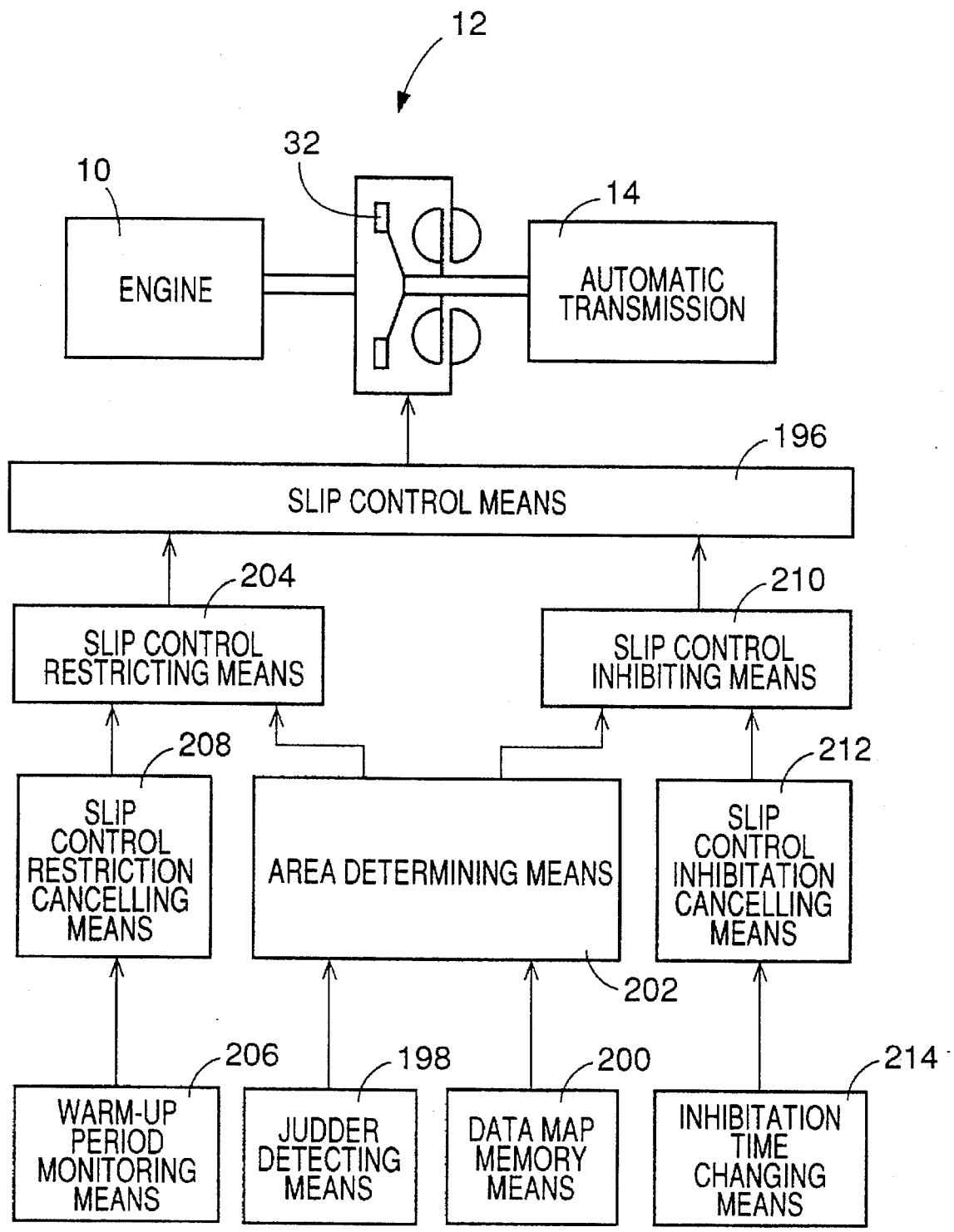
FIG. 8 is a block diagram illustrating the functions of various functional means incorporated in the slip control apparatus.

Referring next to the block diagram of FIG. 8, there will be described the functions of various functional means provided in the electronic transmission controller 184. That is, the transmission controller 194 incorporates slip control means 196, judder detecting means 198, data-map memory means 200, area determining means 202, slip control restricting means 204, warm-up period monitoring means 206, slip control restriction cancelling means 208, slip control inhibiting means 210, slip control inhibition cancelling means 212, and inhibition time changing means 214.

Figure 9:
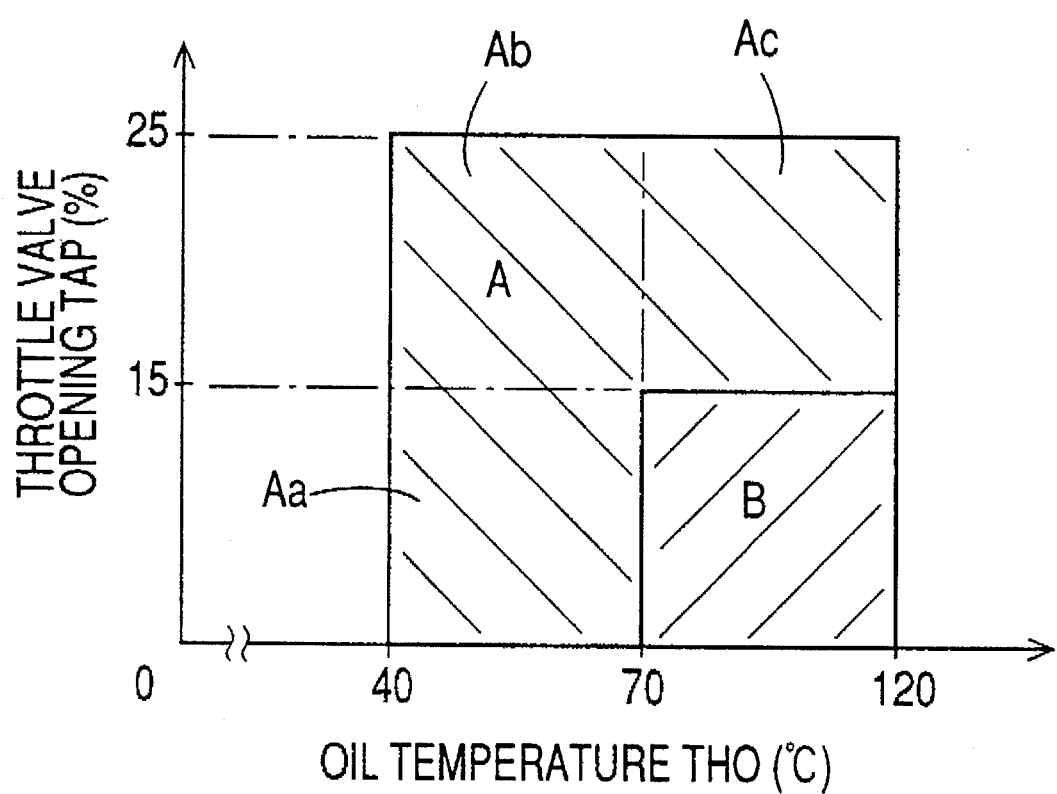
FIG. 9 is a graph indicating two vehicle condition areas defined by vehicle condition parameters, which areas are represented by data map stored in area-data memory means shown in FIG. 8.

When the vehicle running condition is determined to fall in the slip control area explained above by reference to FIG. 7, the slip control means 196 calculates the duty ratio $D_{SLU}$ of the linear solenoid valve SLU, namely, the SLIP CONTROL current $I_{SLU}$ to be applied to the solenoid coil 118, according to the above equation (2), so that the detected slip speed $N_{SLP}$ ($=N_E-N_T$) of the lock-up clutch 32 coincides with a predetermined target slip speed TNSLP. The judder detecting means 198 determines whether the lock-up clutch 32 under the slip control by the slip control means 196 is experiencing a "judder". This determination is effected on the basis of the variations of the speed $N_T$ of the turbine impeller 22, for example. The data-map memory means 200, which is constituted by a portion of the ROM of the transmission controller 184, stores data map representative of boundaries defining a first area A and a second area B of the vehicle running condition, as indicated in FIG. 9. In the present embodiment, the boundaries are relationships between the throttle valve opening TAP and the temperature THO of the working oil in the torque converter 12. When the TAP-THO condition is in the first area A, the judder of the lock-up clutch 32 is relatively likely to occur. In the second area B, the judder is relatively unlikely to occur. The area determining means 202 is adapted to determine whether the TAP-THO condition upon detection of a judder of the clutch 32 by the judder detecting means 198 is in either the first area A or the second area B. If the area determining means 202 has determined that the TAP-THO condition is in the first area A in which the judder is relatively likely to occur, the slip control restricting means 204 is adapted to inhibit the slip control of the clutch 32 while the TAP-THO condition is in the first area A, but permits the slip control while the TAP-THO condition is in the second area B in which the judder is relatively unlikely to occur.

The warm-up period monitoring means 206 is adapted to determine whether the required warm-up period of the lock-up clutch 32 has expired while the slip control is permitted by the restricting means 204 with respect to the second area B only. The slip control restriction cancelling means 208 is adapted to cancel the inhibition of the slip control of the clutch 32 with respect to the first area A, when the warm-up period monitoring means 206 has determined that the warm-up period of the clutch 32 has expired.

The slip control inhibiting means 210 is adapted to inhibit the slip control of the clutch 32 irrespective of the first area A or second area B of the current TAP-THO condition, if the area determining means 202 has determined that the judder detected by the judder detecting means 198 occurred while the TAP-THO condition was in the second area B. The slip control inhibition cancelling means 212 is adapted to cancel the inhibition of the slip control and permit the slip control if a predetermined time has passed after the slip control inhibiting means 210 has initiated the inhibition. The inhibition time changing means 214 changes the time duration of the slip control inhibition by the slip control inhibiting means 212 such that the inhibition time increases with the degree of the judder detected.

Figure 10:
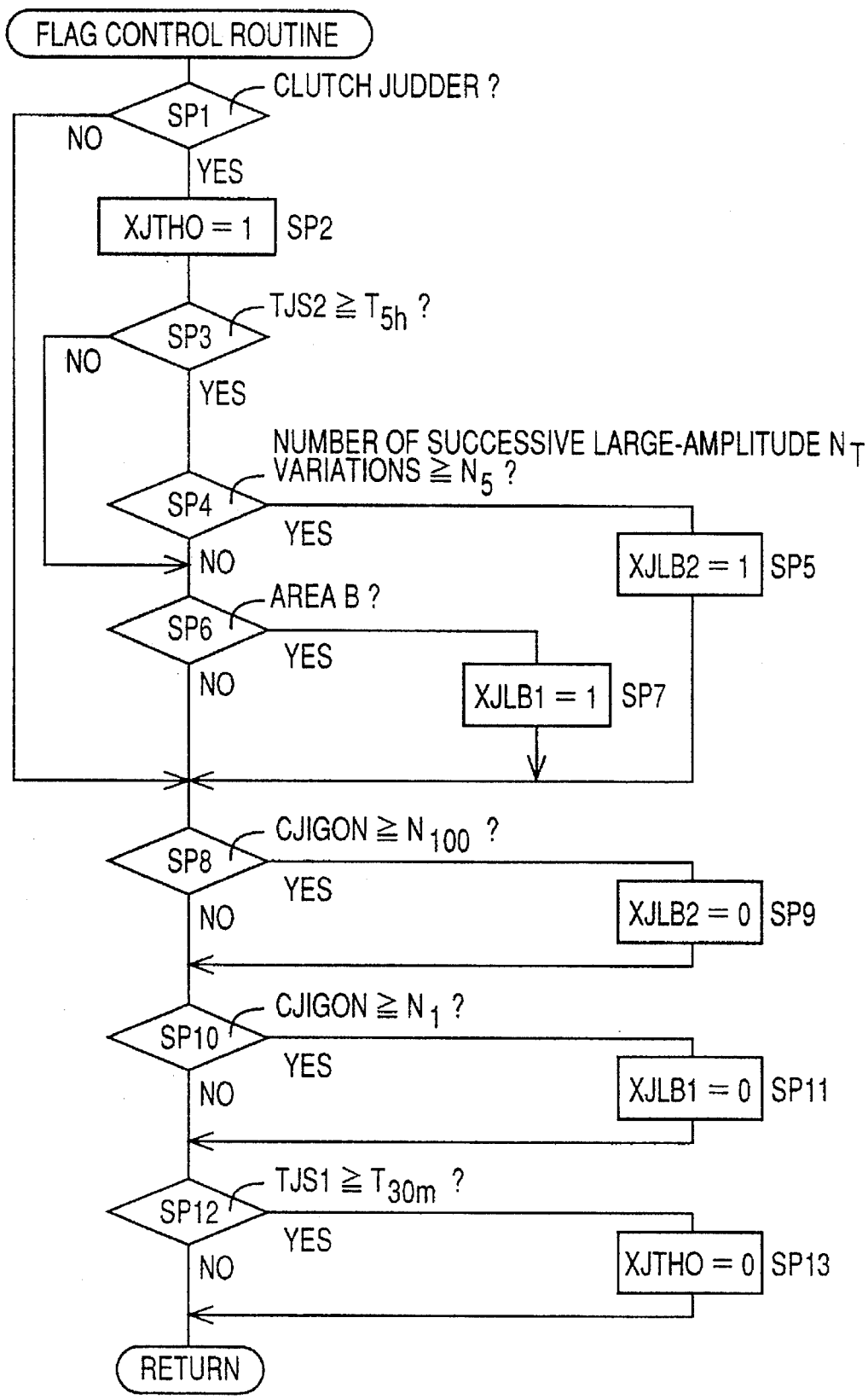
FIG. 10 is a flow chart schematically illustrating a flag control routine executed by the slip control apparatus.
Figure 11:
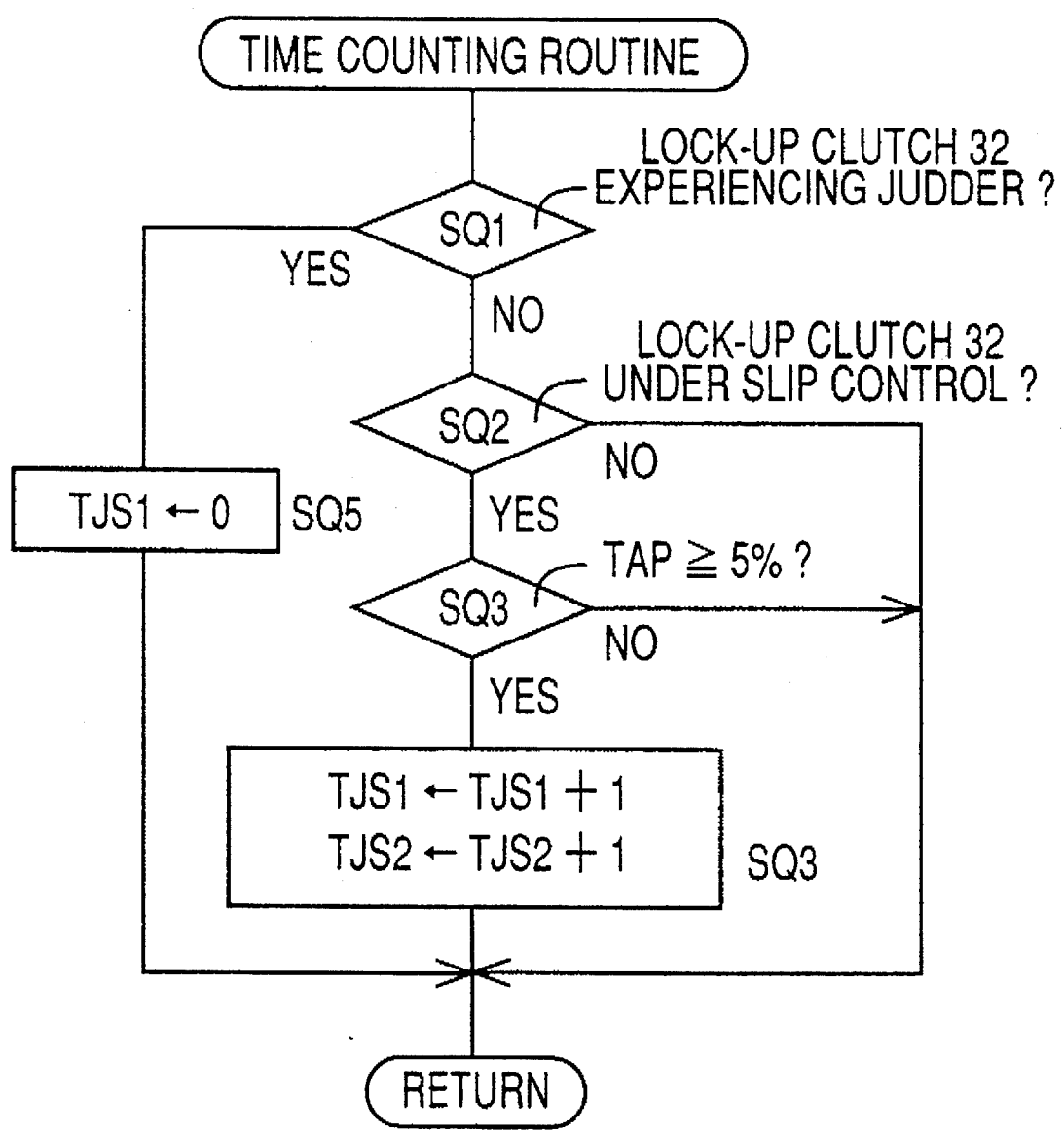
FIG. 11 is a flow chart illustrating an operation of a timer for measuring cumulative times used in the flag control routine of FIG. 10.
Figure 12:
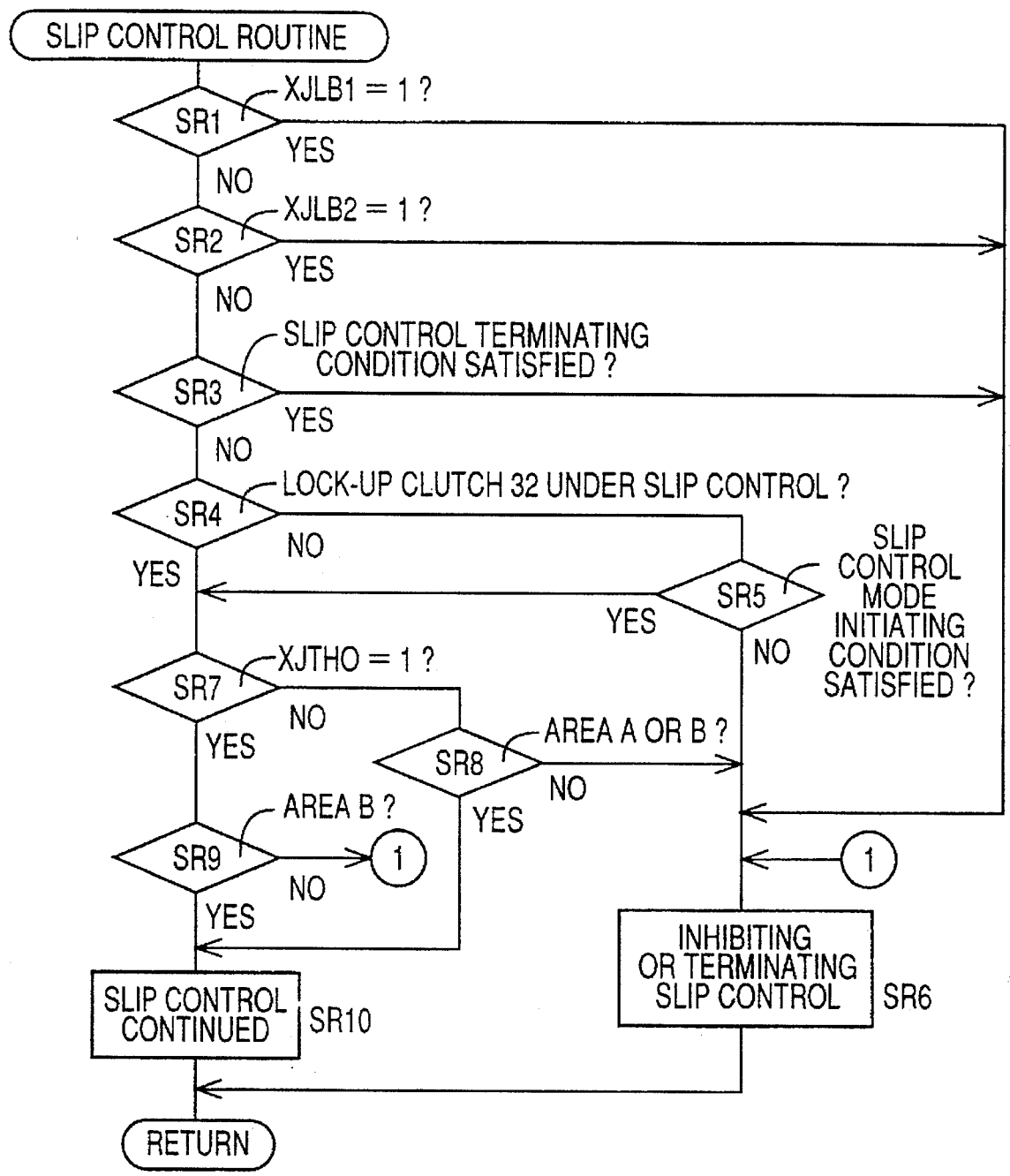
FIG. 12 is a flow chart illustrating a slip control routine executed by the slip control apparatus to control the lock-up clutch.
Figure 14:
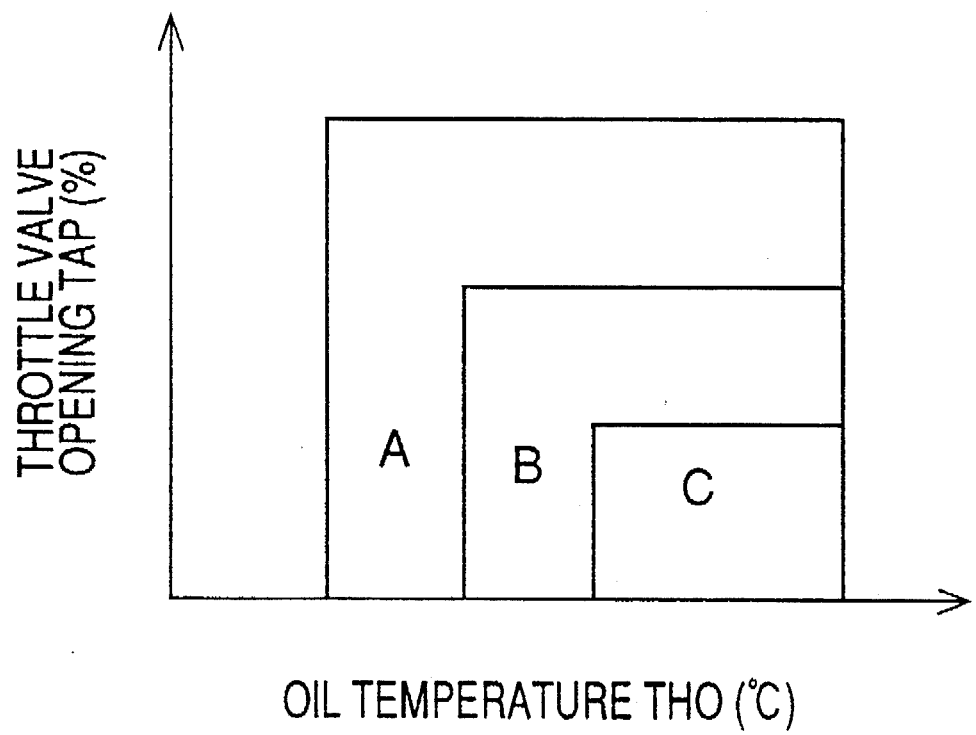
FIG. 14 is a graph corresponding to that of FIG. 9, showing another embodiment of the invention.

The functions of the various means indicated above will be better understood by reading the following description on the operation of the transmission controller 184 by reference to the flow charts of FIGS. 10, 11 and 12, which illustrate a flag control routine, a time counting routine and a slip control routine, respectively. These routines are repeatedly executed either in parallel or in sequence.

The flag control routine of FIG. 10 is provided to set or reset a RESTRICTED SLIP CONTROL MODE flag XJTHO, a FIRST INHIBIT MODE flag XJLB1 and a SECOND INHIBIT MODE flag XJLB2. The RESTRICTED SLIP CONTROL MODE flag XJTHO when set at "1" indicates a restricted slip control mode which is established if the TAP-THO condition upon detection of "judder" of the lock-up clutch 32 under the slip control is in the first area A of FIG. 9 in which the judder is relatively likely to occur. In this restricted slip mode, the slip control of the lock-up clutch 32 is inhibited while the TAP-THO condition is in the first area A, but is permitted while the TAP-THO condition is in the second area B in which the judder is relatively unlikely to occur. The FIRST INHIBIT MODE flag XJLB1 when set at "1" indicates a first slip control inhibit mode which is established if the judder is detected while the TAP-THO condition is in the second area B. In this first slip control inhibit mode, the slip control of the lock-up clutch 32 is inhibited. The SECOND INHIBIT MODE flag XJLB2 when set at "1" indicates a second slip control inhibit mode which is established if, for example, the cumulative slip control time of the lock-up clutch 32 exceeds 5 hours and if the lock-up clutch 32 have experienced a "heavy judder", for instance, five or more successive large-amplitude variations of the turbine speed $N_T$ without a time interval shorter than 5 minutes between the adjacent variations. In this second slip control inhibit mode, too, the slip control of the lock-up clutch 32 is inhibited.

The flag control routine of FIG. 10 uses a first cumulative time TJS1 and a second cumulative time TJS2 which are measured by respective time counters provided in the transmission controller 184, in the time counting routine (SQ1 through SQ5) illustrated in the flow chart of FIG. 11. The time counters are incremented (SQ4) each time the routine of FIG. 11 is executed at a predetermined cycle time. The first cumulative time TJS1, which is used in step SP12 of the routine of FIG. 10 is a time duration of a slip control operation (step SQ2) of the lock-up clutch 32 with the vehicle in an accelerating state with the throttle valve opening TAP not smaller than than 5% (SQ3) and without detection of a "judder" of the clutch 32 (step SQ1). This cumulative time TJS1 is reset to "0" (SQ5) each time a "judder" of the clutch 32 is detected (step SQ1). The second cumulative time TJS2, which is used in step SP3 of the routine of FIG. 10, is a cumulative time of the slip control operation of the clutch 32 in the vehicle accelerating state after the transmission controller 184 is connected to the battery (namely, the second cumulative time TJS2 is reset to zero when the controller 184 is disconnected from the battery for a maintenance purpose, for example). This second cumulative time TJS2 is not reset to "0" upon detection of the "judder" of the lock-up clutch 32.

The flag control routine of FIG. 10 is initiated with step SP1 to determine whether the lock-up clutch 32 is experiencing a "judder", which is a frictional vibration of the clutch 32 during the slip control. This determination is made on the basis of the number of variations of the speed $N_T$ of the turbine impeller 22 within a predetermined time, which variations have an amplitude larger than a predetermined threshold. It will be understood that a portion of the transmission controller 184 assigned to implement step SP1 constitutes the judder detecting means 198.

If a negative decision (NO) is obtained in step SP1, the control flow goes to step SP8 and subsequent steps for clearing the flags XJTHO, XJLB1, XJLB2. If an affirmative decision (YES) is obtained in step SP1, the control flow goes to step SP2 to set the RESTRICTED SLIP CONTROL MODE flag to "1".

Step SP2 is followed by step SP3 to determine whether the second cumulative time TJS2 of the slip control of the lock-up clutch 32 is equal to or longer than a predetermined threshold T5h. The threshold T5h corresponds to an expected run-in period of the lock-up clutch 32 after the clutch 32 is initially operated or after its service life is begun. In this respect, it is noted that the clutch 32 is comparatively likely to experience a judder during the run-in period following its initial use. For example, the threshold T5h is selected to be about 5 hours.

While the cumulative time duration of the slip control operation of the lock-up clutch 32 is relatively short, a negative decision (NO) is obtained in step SP3, and the control flow goes to step SP6 to determine whether the TAP-THO condition (combination of the throttle valve opening TAP and the oil temperature THO) is in the second area B as distinguished from the first area A as indicated in the graph of FIG. 9. As described above, the lock-up clutch 32 is relatively unlikely to experience a judder while the TAP-THO condition is in the second area B. An affirmative decision (YES) obtained in step SP6 indicates that the TAP-THO condition is in the second area B while the clutch 32 is experiencing a judder. If the affirmative decision is obtained in step SP6, therefore, step SP7 is implemented to set the first INHIBIT MODE flag XJLB1 to "1". If a negative decision (NO) is obtained in step SP6, step SP8 is implemented.

When the second cumulative time TJS2 of the slip control operation of the clutch 32 exceeds the threshold T5h, an affirmative decision (YES) is obtained in step SP3, and the control flow goes to step SP4 to determine whether the clutch 32 has experienced a "heavy judder", that is, whether the number of large-amplitude variations of the speed $N_T$ of the turbine impeller 22 which have occurred is equal to or larger than a predetermined threshold $N_5$ (e.g., "5" as indicated above). If a negative decision (NO) is obtained in step SP4, the control flow goes to step SP6. If an affirmative decision (YES) is obtained in step SP4, this indicates that the cumulative time duration of the slip control operation of the clutch 32 exceeds the threshold T5h and that the clutch 32 has experienced a heavy judder (five or more successive variations of the turbine impeller speed $N_T$ whose amplitude is larger than the predetermined limit). In this case, the control flow goes to step SP5 to set the SECOND INHIBIT MODE flag XJB2 to "1". It will be understood that a portion of the transmission controller 184 assigned to implement steps SP5, SP7 and step SR6 of FIG. 12 (which will be described) constitutes the slip control inhibiting means 210 indicated above by reference to FIG. 8.

Step SP8 is implemented if the negative decision (NO) is obtained in step SP6 or after step SP5 or SP7 is implemented. Step SP8 is provided to determine whether the number CJIGON of operations of an ignition key of the vehicle is equal to or larger than a predetermined threshold $N_{100}$, which may be "100" for example.

If an affirmative decision (YES) is obtained in step SP8, the control flow goes to step SP9 to reset the SECOND INHIBIT MODE flag XJLB2 to "0". Step SP9 is implemented if a negative decision (NO) is obtained in step SP8 or after step SP10 is implemented. Step SP9 is provided to determine whether the ignition key has been operated a predetermined number of times after the first slip control inhibit mode is established (in step SP7). This determination in step SP10 is effected to determine whether a predetermined time (corresponding to a threshold $N_1$ used) has passed after the first slip control inhibit mode is established, so that the FIRST INHIBIT MODE flag XJLB1 is reset to "0" in step SP11 after the predetermined time has passed. For example, the threshold $N_1$ of the number of operations of the ignition key used in step SP10 is "1". The first slip control inhibit mode is cancelled (with the FIRST INHIBIT MODE flag XJLB1 reset to "0") in step SP11, in view of a possibility that the affirmative decision (YES) was erroneously obtained in step SP6, and a possibility that the cause (e.g., deterioration of the oil or use of an unsuitable oil) which has caused a judder in the second area B has already been removed.

Step SP11 is implemented to reset the FIRST INHIBIT MODE flag XJLB1 to "0" if the affirmative decision (YES) is obtained in step SP10, as indicated above. Step SP12 is implemented if a negative decision (NO) is obtained in step SP10 or after step SP11 is implemented. Step SP12 is provided to determine whether the first cumulative time TJS1 indicated above has reached or exceeded a predetermined threshold T30m. If an affirmative decision (YES) is obtained in step SP12, step SP13 is implemented to reset the RESTRICTED SLIP CONTROL MODE flag XJTHO to "0", that is, to cancel the restricted slip control mode which has been established in step SP2 due to an occurrence of a judder (detected in step SP1). In this respect, it is noted that the judder may possibly occur while the TAP-THO condition is in a sub-area Ab of the first area A, because the required warm-up period of the clutch 32 has not expired after the ignition key is turned on, that is, because the operating state of the clutch 32 has not yet become steady. In view of this possibility, the clutch 32 is controlled in the restricted slip control mode in which the slip control is permitted only when the TAP-THO condition is in the second area B. During the operation in this restricted slip control mode, the required warm-up period of the clutch 32 expires. The expiration of the warm-up period is detected in step SP12 by determining whether the measured first cumulative time TJS1 has reached or exceeded the threshold T30m. This threshold T30m is determined to be slightly longer than the required warm-up period of the lock-up clutch 32. For example, the threshold T30m is about 30 minutes.

It will be understood that a portion of the transmission controller 184 assigned to implement step SP12 constitutes the warm-up period monitoring means 206 indicated above.

It is also noted that when the FIRST INHIBIT MODE flag XJLB1 and the SECOND INHIBIT MODE flag XJLB1 are reset to "0", the RESTRICTED SLIP CONTROL flag XJTHO which has been set to "1" in the cycle in which the flags XJLB1, XJLB2 have been set to "1" is not reset to "0", because the second cumulative time XJLB2 is not measured as long as the slip control is inhibited with the flags XJLB1, XJLB2 being set at "1". Accordingly, the restricted slip control mode is established when the first and second inhibit modes are cancelled. It is further noted that the duration (corresponding to the threshold $N_{100}$ used in step SP8) of the second inhibit mode is made longer than the duration (corresponding to the threshold $N_1$ used in step SP10) of the first inhibit mode, since the second inhibit mode is established if the lock-up clutch 32 has experienced the "heavy judder" (which involves successive large-amplitude variations of the turbine impeller speed $N_T$ as discussed above). It will therefore be understood that a portion of the controller 184 assigned to implement steps SP8 and SP10 constitutes the inhibition time changing means 214 indicated above, while a portion of the controller 184 assigned to implement steps SP9 and SP11 constitutes the slip control inhibition cancelling means 212 indicated above.

It will also be understood that the slip control restriction cancelling means 208 indicated above is constituted by a portion of the controller 184 assigned to implement step SP13 when the affirmative decision (YES) is obtained in step SP12.

The RESTRICTED SLIP CONTROL MODE flag XJTRO, FIRST INHIBIT MODE flag XJLB1 and SECOND INHIBIT MODE flag XJLB2 are set or reset in the routine of FIG. 10. Based on the thus set or reset flags, the slip control routine to control the lock-up clutch 32 is executed as illustrated in the flow chart of FIG. 12, when the vehicle running condition is in the slip control area of FIG. 7.

The slip control routine is initiated with steps SR1 and SR2 to determine whether the FIRST INHIBIT MODE flag XJLB1 and the SECOND INHIBIT MODE flag XJLB2 are set at "1". If an affirmative decision (YES) is obtained in either one of these steps SR1, SR2, the control flow goes to step SR6 to establish the corresponding first or second inhibit mode for inhibiting the slip control of the lock-up clutch 32. If a negative decision (NO) is obtained in both of the steps SR1, SR2, the control flow goes to step SR3 to determine whether predetermined conditions for terminating the slip control are satisfied. When the vehicle is in an accelerating state, these predetermined slip control terminating conditions include a condition that the idling position switch of the throttle sensor 167 is in the ON position, and a condition that the vehicle running condition falls out of the slip control area of FIG. 7. When the vehicle is in a decelerating or coasting state, the slip control terminating conditions include the condition that the idling position switch is in the OFF position.

If an affirmative decision (YES) is obtained in step SR3, the control flow goes to step SR6 to terminate the slip control of the lock-up clutch 32 if it has been initiated. If a negative decision (NO) is obtained in step SR3, the control flow goes to step SR4 to determine whether the lock-up clutch 32 is in the process of slip control. Initially, a negative decision (NO) is obtained in step SR4, and the control flow goes to step SR5 to determine whether predetermined conditions for initiating the slip control are satisfied. When the vehicle is accelerating, the slip control initiating conditions include the condition that the idling position switch is in the OFF position, and the condition that the vehicle running condition is in the slip control area. When the vehicle is decelerating, the slip control initiating conditions include the condition that the idling position switch is in the OFF position.

As long as a negative decision (NO) is obtained in step SR5, step SR6 is implemented to inhibit the slip control operation of the lock-up clutch 32. If an affirmative decision (YES) is obtained in step SR5, the control flow goes to step SR7 to determine whether the RESTRICTED SLIP CONTROL MODE flag XJTHO is set at "1". Initially, a negative decision (NO) is obtained in step SR7, and step SR8 is implemented to determine whether the TAP-THO condition is in the first area A or second area B. If a negative decision (NO) is obtained in step SR8, the slip control is inhibited in step SR6. If an affirmative decision (YES) is obtained in step SR8, the control flow goes to step SR10 to initiate the slip control of the lock-up clutch 32, for controlling the duty ratio $D_{SLU}$ of the linear solenoid valve SLU according to the above equation (2), so that the actual slip speed $N_{SLP}$ ($=N_E-N_T$) of the lock-up clutch 32 coincides with the predetermined target slip speed TNSLP. It will be understood that a portion of the controller 184 assigned to implement step SR10 constitutes the slip control means 196 indicated above by reference to the block diagram of FIG. 8.

With the slip control of the clutch 32 initiated as described above, an affirmative decision (YES) is obtained in step SR4 in the next cycle of execution of the routine of FIG. 12, whereby the following steps SR7–SR10 to continue the slip control of the lock-up clutch 32 as long as the TAP-THO condition is held in the area A or B.

If the RESTRICTED SLIP CONTROL MODE flag XJTHO is set to "1" with the clutch 32 experiencing a judder, the affirmative decision (YES) is obtained in step SR7, and step SR9 is implemented to determine whether the TAP-THO condition is in the second area B. If a negative decision (NO) is obtained in step SR9, the control flow goes to step SR6 to terminate the slip control. If an affirmative decision (YES) is obtained in step SR9, on the other hand, step SR10 is implemented to permit the slip control to be continued. Thus, it will be understood that a portion of the transmission controller 184 assigned to implement step SR9 constitutes the slip control restricting means 204, which is adapted to permit the slip control of the lock-up clutch 32 only when the TAP-THO condition is in the second area B.

The table of FIG. 13 summarizes: the conditions for establishing the restricted slip control mode and the first and second inhibit modes; the conditions for cancelling the restricted slip control mode to establish the normal slip control mode and for cancelling the inhibit modes to establish the restricted slip control mode; and the effects or advantages of the individual modes.

In the present slip control apparatus which has been described, the data map memory means 200 stores data map representative of the boundaries defining the first and second areas A and B of the TAP-THO condition of the vehicle. When the TAP-THO condition is in the first area A, the lock-up clutch 32 is relatively likely to experience a judder. When the TAP-THO condition is in the second area B, the clutch 32 is relatively less likely or is relatively unlikely to experience a judder. The slip control restricting means 204 determines in step SR9 of FIG. 12 whether the TAP-THO condition when the flag XJTHO is set at "1" as a result of detection of the judder of the clutch 32 by the judder detecting means 198 (steps SP1 and SP2 of FIG. 10 and step SR7 of FIG. 12) is in the second area B. The slip control restricting means 204 inhibits the slip control of the clutch 32 if the current TAP-THO condition is in the first area A, and permits the slip control if the TAP-THO condition is in the second area B. Thus, the lock-up clutch 32 is controlled in the restricted slip control mode, namely, the amount of slip of the clutch 32 is controlled even after the occurrence of a judder, if the current TAP-THO condition falls within the second area B in which the clutch 32 is relatively unlikely to experience a judder. The restricted slip control mode is therefore effective to maximize the slip control effect to improve the fuel economy of the vehicle.

Further, the warm-up period monitoring means 206 operates in the restricted slip control mode established by the slip control restricting means 204, to determine in step SP12 of FIG. 10 whether the predetermined warm-up period of the lock-up clutch 32 has expired. Upon determination that the warm-up period has expired, the slip control restriction cancelling means 208 resets the RESTRICTED SLIP CONTROL MODE flag XJTHO to "0" in step SP13 to cancel the restricted slip control mode and establish the normal slip control mode. In other words, the clutch 32 is controlled in the restricted slip control mode even in the event of detection of a judder, during the predetermined warm-up period of the clutch 32, that is, until the friction surface condition of the clutch 32 has become steady. After the expiration of the warm-up period, the clutch 32 is controlled in the normal slip control mode, whereby the fuel economy of the vehicle is further improved.

The present embodiment is also adapted such that the slip control inhibiting means 210 sets the FIRST INHIBIT MODE flag XJLB1 to "1" in step SP7 of FIG. 10 to establish the first slip control inhibit mode, if the TAP-THO condition at the time of detection (step SP1) of a judder of the clutch 32 by the judder detecting means 198 is in the second area B (step SP6) in which the judder is relatively unlikely to occur. In the first slip control inhibit mode, the slip control of the clutch 32 is inhibited irrespective of whether the current TAP-THO condition is in the first area A or second area B. Since the judder which occurred with the TAP-THO condition in the second area B is considered to be relatively unlikely to be removed, the slip control of the clutch 32 is inhibited or terminated, to assure smooth running of the vehicle without juddering of the lock-up clutch 32.

Further, the slip control inhibition cancelling means 212 is provided to reset the flags XJLB2 and XJLB1 in steps SP9 and SP11, respectively, to replace the first or second slip control inhibit mode by the restricted slip control mode, if the predetermined time has passed after the inhibition of the slip control by the slip control inhibiting means 210 is initiated. This predetermined time is the time duration during which the slip control is inhibited, and is measured in steps SP8 and SP10, which correspond to the inhibiting time changing means 214. In the illustrated embodiment, the inhibition time in the first slip control inhibit mode corresponds to 100 times of operations of the ignition key of the vehicle, while the inhibition time in the second slip control inhibit mode corresponds to one operation of the ignition key. Thus, the inhibition time changes with the degree of the judder (degree of the variation of the turbine impeller speed $N_T$) detected. The inhibition time may be considered the required run-in period of the lock-up clutch 32 in which the clutch 32 is expected to become steady. The present arrangement makes it possible to control the clutch 32 in the restricted slip control mode after the required run-in period has passed.

While the present invention has been described in detail in its presently preferred embodiment, it is to be understood that the invention is not limited to the details of the illustrated embodiment, but may be otherwise embodied.

In the illustrated embodiment, the two-dimensional areas A and B are defined by the two parameters, that is, opening TAP of the throttle valve 166 and working oil temperature THO of the torque converter 12, as indicated in FIG. 9. However, these areas A and B may be replaced by two one-dimensional ranges of either one of the throttle valve opening TAP and oil temperature THO. Further, a third parameter such as the turbine impeller speed $N_T$ and the direction of torque transmission through the torque converter 12 may be used in addition to the first and second parameters TAP and THO, to define three-dimensional areas in place of the two-dimensional areas A and B.

Further, the throttle valve opening TAP may be replaced by other parameters indicative of the load or torque of the engine 10, such as the amount of fuel injection into the engine 10, the pressure in the intake pipe of the engine, and the intake air quantity of the engine.

While the first and second areas A and B indicated in FIG. 9 are defined by square boundaries, the areas may be defined by other boundaries such as curved closed loops or contours. The specific lower and upper limit values of the throttle valve opening TAP and oil temperature THO which define the first and second areas A and B may be suitably changed depending upon the particular mechanical structure and torque capacity of the lock-up clutch 32.

Although the judder detecting means 198 is adapted to detect an occurrence of a judder of the lock-up clutch 32 on the basis of variations of the speed $N_T$ of the turbine impeller 22, it is possible to use a parameter other than the speed $N_T$, such as the speed of the input shaft 20 of the automatic transmission 14 connected to the turbine impeller 22, provided the parameter used is substantially the same as the speed $N_T$.

In the illustrated embodiment, steps SP4 and SP5 are provided to set the SECOND INHIBIT MODE flag XJLB2 to "1" to establish the second slip control inhibit mode if the lock-up clutch 32 has experienced a "heavy judder", which is defined as five or more successive variations of the speed $N_T$ of the turbine impeller 22 whose amplitude is larger than a predetermined threshold. However, the flag XJLB2 may be set to "1" if the working oil in the torque converter 12 is excessively deteriorated. In this case, a pH sensor for detecting the pH value of the oil which changes with the hydrogen ion concentration of the oil may be used as means for detecting the degree of deterioration of the oil, so that the flag XJLB2 is set to "1" if the detected pH value is outside a predetermined tolerable range. In this respect, it is noted that the working oil usually contains an agent to improve the friction of the clutch 32, and the hydrogen ion concentration of the oil changes due to microphotographic or molecular-level rupturing of the clutch 32 by shearing caused by frictional contact of the clutch 32 with the pump impeller 18.

Although the illustrated embodiment is adapted to reset the SECOND INHIBIT MODE flag XJLB2 when the ignition key has been operated 100 times, this flag need not be reset. Further, the flags XJLB1 and XJLB2 may be reset when the cumulative running distance or time of the vehicle has reached a predetermined value.

It is to be understood that the present invention may be embodied with various other changes, modifications and improvements, which may occur to those skilled in the art, without departing from the spirit and scope of the invention defined in the following claims.

What is claimed is:

1. An apparatus for controlling an amount of slip of a lock-up clutch disposed between a pump impeller and a turbine impeller in a fluid-filled power transmitting device in a power transmitting system of a motor vehicle, wherein said pump impeller is connected to an engine and said fluid-filled power transmitting device is operated with a working fluid, said apparatus including slip control means for controlling the amount of slip of said lock-up clutch such that an actual slip speed of said lock-up clutch coincides with a predetermined target slip speed, said apparatus comprising:

- judder detecting means for detecting an occurrence of a judder of said lock-up clutch during a slip control operation of the lock-up clutch by said slip control means;
- memory means for storing area data representative of a first area and a second area of a running condition of the vehicle represented by an amount of load acting on said engine and a temperature of said working fluid, said first and second areas being defined such that said lock-up clutch is likely to experience said judder while said running condition is in said first area, and less likely to experience said judder while said running condition is in said second area than while said running condition is in said first area; and
- slip control restricting means for establishing a restricted slip control mode if said running condition upon detection of said judder by said judder detecting means is in said first area, said slip control restricting means operating in said restricted slip control mode, so as to inhibit said slip control means from effecting said slip control operation of said lock-up clutch when the running condition of the vehicle is in said first area, and to permit said slip control means to effect said slip control operation when said running condition is in said second area.

2. An apparatus according to claim 1, wherein said amount of load acting on said engine is represented by an amount of opening of a throttle valve of said engine of the vehicle, said first and second areas being defined by said amount of opening of said throttle valve and said temperature of the working fluid.

3. An apparatus according to claim 1, further comprising:

- warm-up period monitoring means operable in said restricted slip control mode established by said slip control restricting means, for determining whether a predetermined warm-up period of said lock-up clutch has passed after said restricted slip control mode is established; and
- slip control restriction cancelling means for cancelling said restricted slip control mode, if said warm-up period monitoring means determines that said warm-up period has passed.

4. An apparatus according to claim 3, wherein said warm-up period monitoring means determines whether a cumulative time of control of the amount of slip of said lock-up clutch by said slip control means exceeds a predetermined reference, to determine whether said predetermined warm-up period of said lock-up clutch has passed.

5. An apparatus according to claim 1, further comprising slip control inhibiting means for establishing a slip control inhibit mode if said running condition upon detection of said judder by said judder detecting means is in said second area, said slip control inhibiting means operating in said slip control inhibit mode, so as to inhibit said slip control means from effecting the slip control operation of said lock-up clutch irrespective of whether the running condition of the vehicle is in said first area or said second area.

6. An apparatus according to claim 3, further comprising:

- slip control inhibition cancelling means for cancelling said slip control inhibit mode and permitting said slip control operation of said lock-up clutch when a predetermined inhibition time has passed after said slip control inhibit mode is established by said slip control inhibiting means.

7. An apparatus according to claim 6, wherein said slip control inhibition cancelling means comprises means for counting the number of operation of an ignition key of the vehicle, and means for determining, on the basis of said number of operation of said ignition key, whether said predetermined inhibition time has passed.

8. An apparatus according to 6, further comprising inhibition time changing means for changing said predetermined inhibition time such that said inhibition time increases with an increase in a degree of vibration of said slip speed of said lock-up clutch which is caused by said judder.

9. An apparatus for controlling an amount of slip of a lock-up clutch disposed between a pump impeller and a turbine impeller in a fluid filled power transmitting device in a power transmitting system of a motor vehicle, wherein said pump impeller is connected to an engine and said fluid-filled power transmitting device is operated with a working fluid, said apparatus including slip control means for controlling the amount of slip of said lock-up clutch such that an actual slip speed of said lock-up clutch coincides with a predetermined target slip speed, said apparatus comprising:

- judder detecting means for detecting an occurrence of a judder of said lock-up clutch during a slip control operation of the lock-up clutch by said slip control means;
- memory means for storing area data representative of a first area and a second area of a running condition of the vehicle represented by an amount of load acting on said engine and a temperature of said working fluid, said first and second areas being defined such that said lock-up clutch is likely to experience said judder while said running condition is in said first area, and less likely to experience said judder while said running condition is in said second area than while said running condition is in said first area; and
- slip control inhibiting means for establishing a slip control inhibit mode if said running condition upon detection of said judder by said judder detecting means is in said second area, said slip control inhibiting means operating in said slip control inhibit mode, so as to inhibit said slip control means from effecting said slip control operation of said lock-up clutch irrespective of whether the running condition of the vehicle is in said first area or said second area.

10. An apparatus according to claim 9, wherein said first and second areas represented by said area data stored in said memory means are defined by at least one of a load currently acting on an engine of the vehicle and a current temperature of a working fluid used for operating said lock-up clutch.

11. An apparatus for controlling an amount of slip of a lock-up clutch disposed between a pump impeller and a turbine impeller in a power transmitting system of a motor vehicle, said apparatus including slip control means for controlling the amount of slip of said lock-up clutch such that an actual slip speed of said lock-up clutch coincides with a predetermined target slip speed, said apparatus comprising:

- judder detecting means for detecting an occurrence of a judder of said lock-up clutch during a slip control operation of the lock-up clutch by said slip control means;
- slip control inhibiting means for establishing a first slip control inhibit mode if a degree of variation of said slip speed of said lock-up clutch caused by said judder detected by said judder detecting means is smaller than a predetermined threshold, and a second slip control inhibit mode if said degree of said judder is not smaller than said predetermined threshold, said slip control inhibiting means operating in said first and second slip control inhibit modes, so as to inhibit said slip control means from effecting said slip control operation by said lock-up clutch;

slip control inhibition cancelling means for cancelling said first and second slip control inhibit modes and permitting said slip control operation of said lock-up clutch when a predetermined inhibition time has passed after said first and second slip control inhibit modes are established by said slip control inhibiting means; and inhibition time changing means for changing said predetermined inhibition time depending upon which one of said first and second slip control inhibit modes is established, such that said inhibition time is longer when said second slip control inhibit mode is established than when said first slip control mode is established.

12. An apparatus according to claim 11, wherein said slip control inhibiting means establishes said first slip control inhibit mode if said judder is detected while the vehicle is in a running condition in which said lock-up clutch is unlikely to experience the judder, and said second slip control inhibit mode if said judder detected by said judder detecting means involves successive variations of said slip speed of said lock-up clutch whose amplitude and number of occurrences are larger than respective predetermined values, and wherein said inhibition time changing means determines said predetermined inhibition time for said first and second slip control inhibit modes such that the inhibition time for said first slip control inhibit mode corresponds to one operation of the vehicle initiated by an operation of an ignition key of the vehicle, while the inhibition time for said second slip control inhibit mode corresponds to an initial run-in period of said lock-up clutch during which an operating characteristic of said lock-up clutch is expected to become steady.

13. An apparatus according to claim 11, wherein said slip control inhibiting means establishes said slip control inhibit mode if said judder is detected by said judder detecting means after a predetermined cumulative time of control of the amount of slip of said lock-up clutch by said slip control means has passed and if said juddger detected after said predetermined cumulative time of control of said amount of slip involves successive variations of said slip speed of said lock-up clutch whose amplitude and number of occurrences are larger than respective predetermined values.

14. An apparatus according to claim 13, wherein said slip control inhibiting means measures said cumulative time of control of said amount of slip of said lock-up clutch after said lock-up clutch is initially operated.

15. An apparatus for controlling an amount of slip of a lock-up clutch disposed between a pump impeller and a turbine impeller in a fluid-filled power transmitting device in a power transmitting system of a motor vehicle, wherein said pump impeller is connected to an engine and said fluid-filled power transmitting device is operated with a working fluid, said apparatus including slip control means for controlling the amount of slip of said lock-up clutch such that an actual slip speed of said lock-up clutch coincides with a predetermined target slip speed, said apparatus comprising:

judder detecting means for detecting an occurrence of a judder of said lock-up clutch during a slip control operation of the lock-up clutch by said slip control means;

memory means for storing area data representative of a first area and a second area of a running condition of the vehicle represented by at least one of an amount of load acting on said engine and a temperature of said working fluid, said first and second areas being defined such that said lock-up clutch is likely to experience said judder while said running condition is in said first area, and less likely to experience said judder while said running condition is in said second area than while said running condition is in said first area; and slip control restricting means for establishing a restricted slip control mode if said running condition upon detection of said judder by said judder detecting means is in said first area, said slip control restricting means operating in said restricted slip control mode, so as to inhibit said slip control means from effecting said slip control operation of said lock-up clutch when the running condition of the vehicle is in said first area, and to permit said slip control means to effect said slip control operation when said running condition is in said second area.

16. An apparatus for controlling an amount of slip of a lock-up clutch disposed between a pump impeller and a turbine impeller in a fluid-filled power transmitting device in a power transmitting system of a motor vehicle, wherein said pump impeller is connected to an engine and said fluid-filled power transmitting device is operated with a working fluid, said apparatus including slip control means for controlling the amount of slip of said lock-up clutch such that an actual slip speed of said lock-up clutch coincides with a predetermined target slip speed, said apparatus comprising:

judder detecting means for detecting an occurrence of a judder of said lock-up clutch during a slip control operation of the lock-up clutch by said slip control means;

memory means for storing area data representative of a first area and a second area of a running condition of the vehicle represented by at least one of an amount of load acting on said engine and a temperature of said working fluid, said first and second areas being defined such that said lock-up clutch is likely to experience said judder while said running condition is in said first area, and less likely to experience said judder while said running condition is in said second area than while said running condition is in said first area; and slip control inhibiting means for establishing a slip control inhibit mode if said running condition upon detection of said judder by said judder detecting means is in said second area, said slip control inhibiting means operating in said slip control inhibit mode, so as to inhibit said slip control means from effecting said slip control operation of said lock-up clutch irrespective of whether the running condition of the vehicle is in said first area or said second area.

* * * * *